(12) United States Patent
Yamamoto et al.

(10) Patent No.: US 7,628,497 B2
(45) Date of Patent: Dec. 8, 2009

(54) MIRROR UNIT, METHOD OF PRODUCING THE SAME, AND EXPOSURE APPARATUS AND METHOD USING THE MIRROR UNIT

(75) Inventors: Takeshi Yamamoto, Kanagawa-ken (JP); Akiri Miyake, Tochigi-ken (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/938,439

(22) Filed: Nov. 12, 2007

(65) Prior Publication Data
US 2008/0117512 A1 May 22, 2008

Related U.S. Application Data

(62) Division of application No. 11/113,113, filed on Apr. 22, 2005, now Pat. No. 7,311,407.

(30) Foreign Application Priority Data

Apr. 23, 2004 (JP) ............................. 2004-128128

(51) Int. Cl.
G02B 5/08 (2006.01)
(52) U.S. Cl. ..................... 359/846; 359/883; 378/34; 355/53
(58) Field of Classification Search .................. 359/359, 359/360, 584, 587, 588, 589, 846, 847, 883; 378/34; 355/53
See application file for complete search history.

(56) References Cited

U.S. PATENT DOCUMENTS 6,843,572 B2   1/2005   Shiraishi
7,474,733 B1 *  1/2009   Yamamoto ................... 378/84

(Continued)

FOREIGN PATENT DOCUMENTS

JP           5-100087       4/1993

(Continued)

OTHER PUBLICATIONS

Masaki Yamamoto, "Sub-nm figure error correction of an extreme ultraviolet multilayer mirror by its surface milling", Nuclear Instruments & Methods in Physics Research, Section A, 467-468 (2001), 1282-1285.

(Continued)

*Primary Examiner*—Alessandro Amari
(74) *Attorney, Agent, or Firm*—Rossi, Kimms & McDowell LLP

(57) ABSTRACT

Disclosed are a mirror unit and a method of producing the same. In one preferred embodiment, the mirror unit includes a mirror with a multilayered film formed on a substrate, the multilayered film having two materials periodically laminated in layers on the substrate, and a substrate deforming device for producing deformation of a shape of the substrate of the mirror, wherein, in the multilayered film, the number of laminated layers in a predetermined region of the substrate differs from that in another region of the substrate. A mirror unit producing method according to another preferred embodiment includes forming a multilayered film on a substrate, the multilayered film having two materials periodically laminated in layers on the substrate, providing substrate deforming means in association with the substrate, the deforming means having a function for producing deformation of the shape of the substrate, and partially removing the multilayered film.

7 Claims, 23 Drawing Sheets

U.S. PATENT DOCUMENTS

| | | |
|---|---|---|
| 2003/0142198 A1 | 7/2003 | Miyake |
| 2004/0061868 A1* | 4/2004 | Chapman et al. ............. 356/503 |
| 2005/0157384 A1* | 7/2005 | Shiraishi et al. ............. 359/359 |
| 2005/0162762 A1* | 7/2005 | Novak ........................ 359/849 |

FOREIGN PATENT DOCUMENTS

| | | |
|---|---|---|
| JP | 3010844 | 4/1993 |

OTHER PUBLICATIONS

U. Dinger, et al., "Mirror substrates for EUV-lithography: progress in metrology and optical fabrication technology", Carl Zeiss (Germany), Proceedings of SPIE, vol. 4146 (2000), 35-46.

* cited by examiner

MIRROR UNIT, METHOD OF PRODUCING THE SAME, AND EXPOSURE APPARATUS AND METHOD USING THE MIRROR UNIT

This is a divisional application of prior application Ser. No. 11/113,113 filed on Apr. 22, 2005 now U.S. Pat. No. 7,311,407.

This application claims a benefit of priority based on Japanese Patent Application No. 2004-128128 filed Apr. 23, 2004, for which is hereby incorporated by reference.

FIELD OF THE INVENTION AND RELATED ART

This invention relates to a mirror unit and an exposure apparatus having the same. More particularly, the invention concerns a mirror system suitably usable in an X-ray exposure apparatus, an EUV exposure apparatus or an X-ray microscope, for example.

Lithographic printing (exposure) methods for manufacture of semiconductor devices having an extraordinarily fine circuit pattern such as semiconductor memory or logic circuit include a reduction projection exposure method using ultraviolet rays as printing light.

The linewidth size of a smallest pattern that can be transferred by reduction projection exposure is proportional to the numerical aperture of a projection optical system used. For this reason, light of very short wavelength is used as the light for transferring a fine circuit pattern. Examples are i-line (wavelength 365 nm) emitted from a Hg lamp, light of a wavelength 248 nm emitted from a KrF excimer laser, and light of a wavelength 193 nm emitted from an ArF excimer laser. The wavelength of ultraviolet light used for the projection exposure has been shortened as above.

Circuit patterns of semiconductor devices are becoming smaller and smaller drastically, and this necessitates further shortening of the wavelength much shorter than the wavelength used in the lithography based on ultraviolet light. Particularly, for efficient printing of an extraordinarily fine pattern having a linewidth not greater than 0.1 μm, reduction projection exposure apparatuses that use extreme ultraviolet (EUV) light of a wavelength of about 10-15 nm, quite shorter than ultraviolet rays, have been proposed. An example is Published U.S. patent application, Publication No. USAA2003/142198.

In such EUV light region, absorption of light by a substance is very large and, therefore, use of a refractive optical system that comprises lenses being based on refraction of light, as used traditionally with visible light or ultraviolet light, is impractical. In projection exposure apparatuses using EUV light, therefore, a reflective optical system having mirrors is used. As regards a reticle as well, in that case, a reflection type reticle having a transfer pattern formed on a mirror by use of an absorptive material is used.

As regards a reflection type optical element constituting an exposure apparatus that uses EUV light as exposure light, in many cases, a multilayered film mirror in which two different materials having different optical constants are alternately formed in layers is used. For example, molybdenum (Mo) and silicon (Si) are alternately formed in layers upon the surface of a glass substrate being polished into a precise shape, to provide a multilayered film mirror. Regarding the film layer thickness, the molybdenum layer may be 2 nm, for example, and the silicon layer may be 5 nm, for example. Here, the sum of the thicknesses of a couple of layers of different materials is called a film period. In this example, the film period is about 7 nm.

In order to improve the surface roughness at the interface between the molybdenum layer and the silicon layer, an additional layer for reducing the interface roughness may be inserted to between these layers. An example of materials for reducing the interface roughness is boron carbide ($B_4C$).

When EUV light is incident on such multilayered film mirror, it is reflected thereby. Here, if the incidence angle is θ, the wavelength of the EUV light is λ, the film period is d, only such EUV light having a narrow bandwidth around the wavelength λ that approximately satisfies the following relationship is reflected efficiently:

$$2 \times d \times \cos\theta = \lambda$$

Here, the bandwidth is generally about 0.6 nm to 1 nm.

The reflectance of EUV light reflected thereby is about 70% at the best. Those light rays not reflected by the mirror are absorbed by the multilayered film or the mirror substrate, and most of them are converted into heat.

Since each multilayered film mirror has a large loss of light, the number of multilayered films to be used in an exposure apparatus has to be restricted to minimum. In order to accomplish a wide exposure region by use of a least number of multilayered film mirrors, only a narrow arcuate region (ring field) spaced from the optical axis by a certain distance is used while a reticle and a wafer are simultaneously scanned, thereby to perform unit-magnification scan exposure of a wide area.

For such exposure apparatuses as described above, how to produce a high-precision multilayered film mirror is an indispensable technical issue. Generally, in production of multilayered film mirrors, a member that serves as a mirror substrate is machined and polished into a shape having a predetermined curvature and, subsequently, a multilayered film is formed on the substrate surface. However, as will be described later, the surface shape of the reflection surface of each multilayered film mirror to be used in a projection optical system of an EUV exposure apparatus must have extraordinarily high precision. To meet this, Japanese Patent No. 3010844 proposes a method of improving the precision of a mirror surface shape after a multilayered film is formed on the reflection surface.

Referring now to FIG. 9, a structure for deforming a substrate by use of an actuator such as disclosed in aforementioned Japanese Patent No. 3010844 will be described. Denoted in FIG. 9 at 100 is a mirror that comprises a deformable substrate 101. The surface of the substrate 101 provides a reflection surface 101a. There are a plurality of piezoelectric devices 102 disposed concentrically at the bottom of the substrate 101, and these piezoelectric devices function as an actuator. The piezoelectric devices 102 are arranged so that the same electric voltage is applied to those piezoelectric devices which are disposed along the same circumference (circle) of the same radius from the center. Thus, by applying different electric voltages to different circumferences (circles), an arbitrary revolution surface can be provided. The electric voltage to be applied to piezoelectric devices 120 on each circle is determined on the basis of the amount of change necessary to satisfy the required curvature radius of the reflection surface 101a with respect to the distance from the center, as well as the amount of displacement of the piezoelectric device relative to the applied voltage. Predetermined electric voltages are applied to the piezoelectric devices 102 while being controlled by control means (not shown) such as a computer, for example, and the mirror (spherical mirror) 100 is provided. Then, the curvature radius and the shape of the thus produced spherical mirror are measured. Any deviations (shape errors) from design values are corrected by adjusting the applied voltages to the piezoelectric devices 102.

FIGS. 10A and 10B show an example wherein a multilayered film 105 is formed on a deformable substrate 101 such as shown in FIG. 9, thereby to provide a multilayered film mirror 100.

The multilayered film mirror 100 is produced in accordance with the method having been described with reference to FIG. 9. In FIGS. 10A and 10B, a multilayered film 105 is formed on a silicon wafer 104. At the bottom, there is an electrically conductive material 103 for providing an electrode for piezoelectric devices 102. As shown in FIG. 10A, predetermined voltages are applied from control means to the piezoelectric devices 102 mounted on the bottom of the multilayered film mirror 100, by which the shape of the reflection surface is corrected as shown in FIG. 10B.

Another method of correcting the substrate surface shape of a multilayered film mirror, without use of an actuator, is proposed in "SUB-nm Figure Error Correction of a Multilayer Mirror by Its Surface Milling", Masaaki Yamamoto, *Nuclear Instruments and Methods in Physics Research A*, 467-468(2001).

SUMMARY OF THE INVENTION

As described above, in a projection optical system to be provided in an EUV exposure apparatus that uses EUV light as the exposure wavelength, an incredibly high precision is required for the surface shape of the reflection surface of each multilayered film mirror that constitutes the projection optical system. If, for example, the number of mirrors constituting a projection optical system is n and the wavelength of EUV light is λ, then an allowable shape error σ (rms value) is given by Marechal equation as follows:

$$\sigma = \lambda/(28 \times \sqrt{n})$$

For example, in an exposure apparatus wherein the projection optical system consists of four mirrors and the wavelength λ is 13 nm, σ=0.23 nm. Furthermore, where a pattern having a linewidth with resolution 30 nm is going to be transferred, a wavefront aberration amount that can be allowed throughout the projection optical system will be about 0.4 nm.

However, form the standpoint of production, reducing the shape error of the reflection surface only by the polishing into the allowable range such as described above is practically very difficult. Furthermore, there is a possibility that the surface shape deforms by its self-weight or when it is put on a mounting member or the like.

It is therefore desirable to provide a multilayered film mirror by which any deformation due to the self-weight or from the mounting as well as minute wavefront aberration beyond the limit that can be reached by polishing, can be corrected simultaneously.

However, with the method using an actuator to produce deformation a substrate, it is difficult to correct deformation of small period. Generally, the substrate should have a certain rigidity to keep the mirror rigidity and, therefore, it is difficult to apply deformation of small rigidity. If the rigidity of the substrate is made small, applying deformation of small period may become possible. However, on the other hand, any changes with time or any changes when the mirror substrate is mounted on a polishing apparatus or into an exposure apparatus may become large. This makes the production more difficult.

Correcting deformation of a substrate only by use of coating milling means is disadvantage particularly when a large amount of correction as compared with the phase difference that can be corrected by a pair of layers is going to be made. This is particularly notable when, as shown in FIGS. 13A-13C, large deformation is produced in a region 109 on the surface of a multilayered film mirror having a substrate 112 and a multilayered film 117 provided thereon. As seen in the region 110 of FIG. 13B, the coating milling has to be performed to may layers. If, for example, cutting each layer pair is effective to make correction of 0.2 nm and there is a phase difference corresponding to 10 nm, correcting the whole necessitates cutting fifty layer pairs. This makes the coating milling process very complicated. Furthermore, in order to secure a sufficient reflectance, a large number of multiple layers corresponding to it should be formed beforehand. This is very difficult from the standpoint of procedure and cost as well. For example, if there is a possibility of cutting fifty layer pairs, fifty layers should be added beforehand to the total number of layers of the multilayered film 117, when the film is formed.

Furthermore, if as shown in FIG. 13C there is a portion 109 in which deformation of the substrate 112 becomes larger, it would be necessary to perform the coating milling process to beyond the limit of layer pairs (111) providing a required reflectance. However, in that occasion, a high reflectance which is very the function of a multilayer film may not be attainable.

It is accordingly an object of the present invention to provide a multilayered film mirror or a mirror unit by which at least one of the inconveniences described above can be solved or reduced.

In accordance with an aspect of the present invention, there is provided a mirror unit, comprising: a mirror with a multilayered film formed on a substrate, said multilayered film having two materials periodically laminated in layers on the substrate; and substrate deforming means for producing deformation of a shape of the substrate of the mirror; wherein, in the multilayered film, the number of laminated layers in a predetermined region of the substrate differs from that in another region of the substrate.

In accordance with another aspect of the present invention, there is provided a method of producing a mirror unit, comprising the steps of: forming a multilayered film on a substrate, the multilayered film having two materials periodically laminated in layers on the substrate; providing substrate deforming means in association with the substrate, the deforming means having a function for producing deformation of the shape of the substrate; and partially removing the multilayered film.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Briefly, in accordance with the present invention, substrate deforming means for producing deformation of a substrate as well as coating and milling means, that is, a method for partially removing a multilayered film, are used in combination appropriately, by which a high performance mirror unit can be accomplished.

Before describing preferred embodiments of the present invention, the features related to the change in shape of a multilayered film mirror will be explained first.

Figure 11:
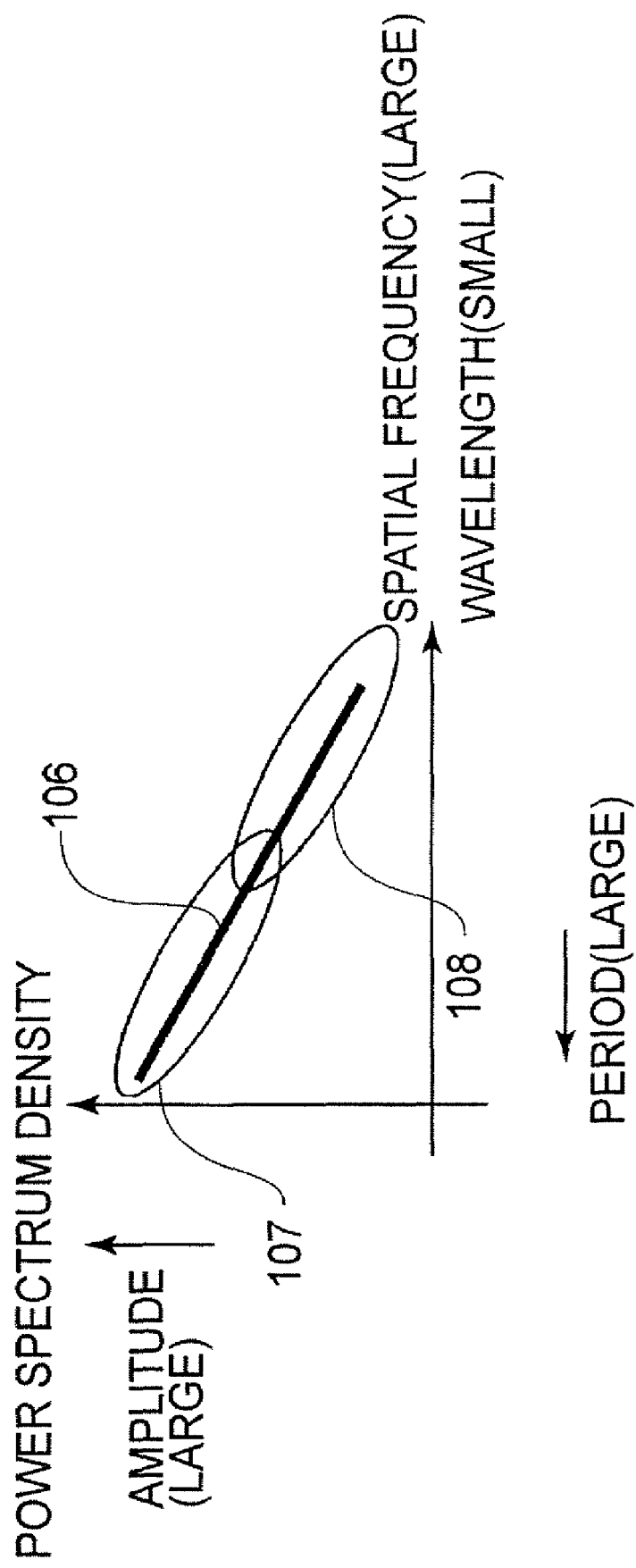
FIG. 11 is a graph for explaining the relationship between the period and the amplitude of a mirror.

The relationship between the period and the amplitude (power spectrum density) of the displacement in the surface shape of a multilayered film mirror is such as shown in the graph of FIG. 11. It is known that, as depicted by a straight line 106 in FIG. 11, the displacement of the mirror surface shape has a relationship that a component having large period has large amplitude while a component having small period has small amplitude.

Hence, as shown in FIG. 11, the displacement of the surface shape can be divided into a group (107) of components which are large in period and amplitude as well and a group (108) of components which are small in period and amplitude as well. Here, the group 107 is defined as "lower-order deformation", while the group 108 is defined as "higher-order deformation".

Next, the coating milling process used in the embodiments to be described later will be explained.

Figure 2B:
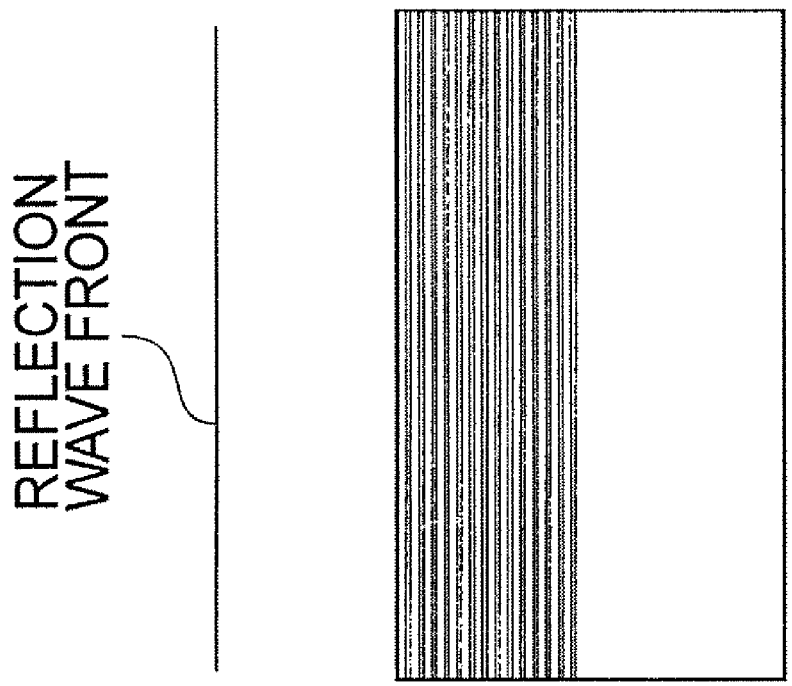
FIGS. 2A and 2B are schematic views, respectively, for explaining incident waves and the wavefront of reflected waves provided by a multilayered film formed on a mirror substrate.
Figure 2A:
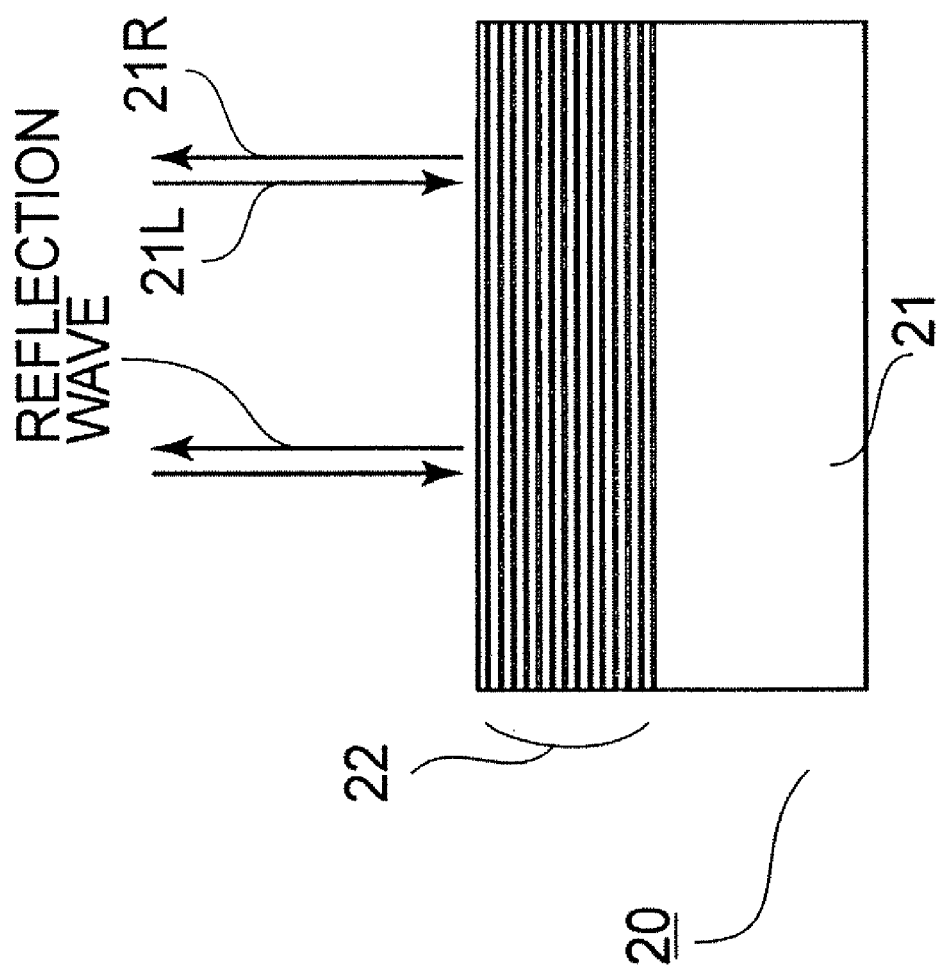
Figure 3A:
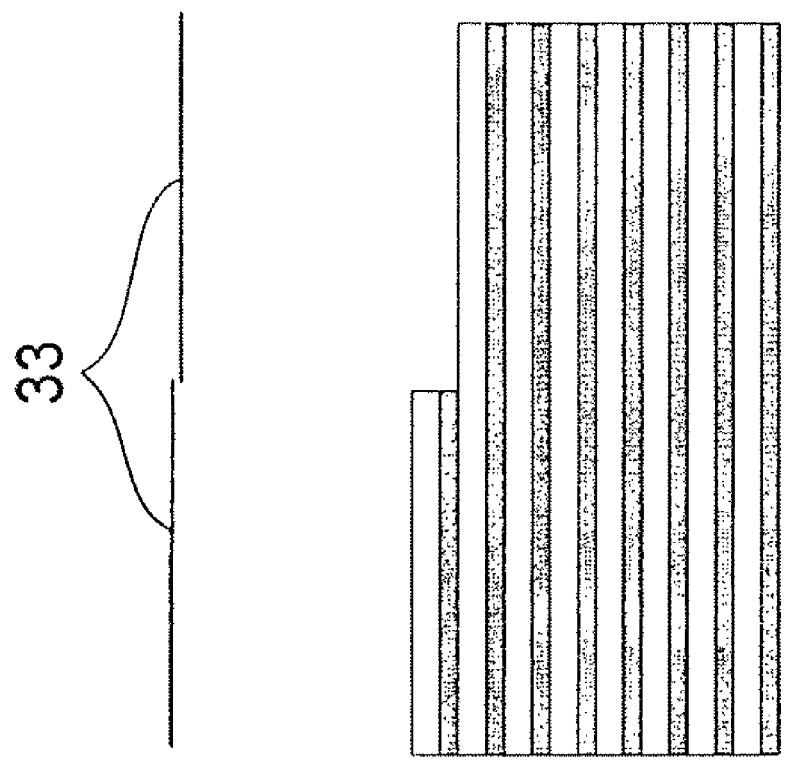
FIGS. 3A and 3B are schematic views, respectively, for explaining in comparison the wavefront of reflected light between different portions having film layer pairs of different numbers.
Figure 3B:
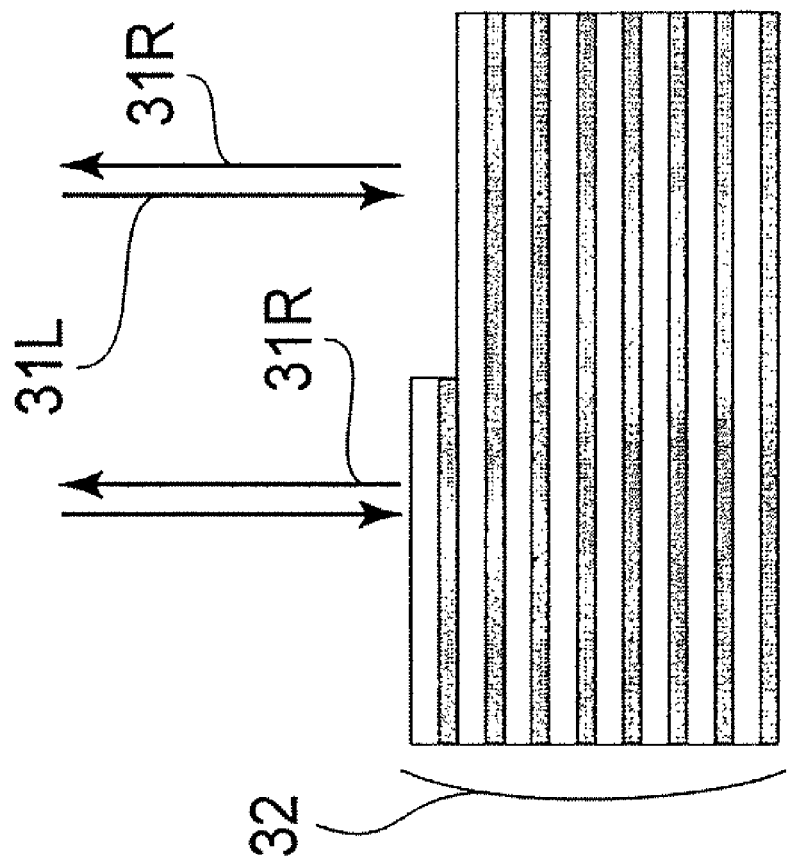

As shown in FIG. 2A, when parallel light 21L having uniform phase is incident on a multilayered film mirror 20 having a mirror substrate 21 and a multilayered film 22 exactly uniformly formed on the mirror substrate 21, the result would be that, as shown in FIG. 2B, reflection light 21R that has a completely registered phase is obtained. On the other hand, comparing the wavefronts of reflected lights from those portions having different layer pairs or layer numbers such as shown in FIG. 3A, there is a phase difference in the reflected wavefront 33 of reflection light 31R as shown in FIG. 3B.

Figure 4:
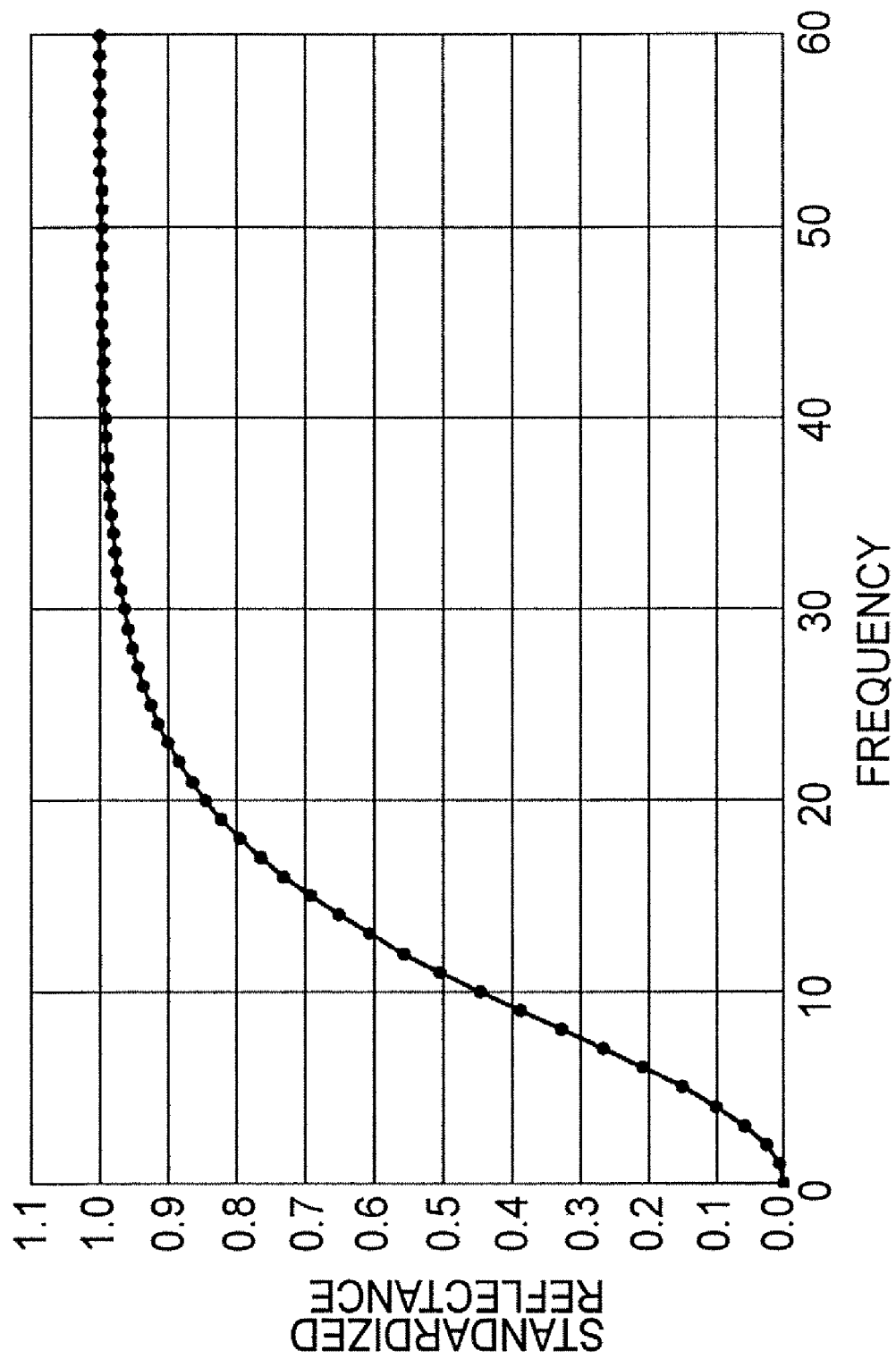
FIG. 4 is a graph for explaining the relationship between the number of periods of the multilayered film and the standardized reflectance.

On the other hand, the reflectance of a multilayered film mirror depends on the number of film periods. FIG. 4 illustrates the relationship between the number of film periods of a multilayered film and the reflectance R having been standardized with respect to the maximum value. It is seen that, up to about 40 (forty) layer pairs, the reflectance R increases largely together with the increase in the number of film periods. Beyond forty layer pairs, however, the reflectance R is substantially saturated. Hence, as long as the state is that a sufficient number of film periods are laminated in layers after the reflectance R is saturated, that is, if, for example, 60 (sixty) layer pairs are laminated in layers, the phenomenon that may arise due to the difference in the number of film periods would be only a difference in phase of the reflected wavefront.

Now, an example wherein molybdenum and silicon are used to provide an Mo/Si multilayered film mirror and wherein EUV light of a wavelength 13.5 nm is incident on that mirror with an incidence angle 10 deg. will be explained.

Figure 5A:
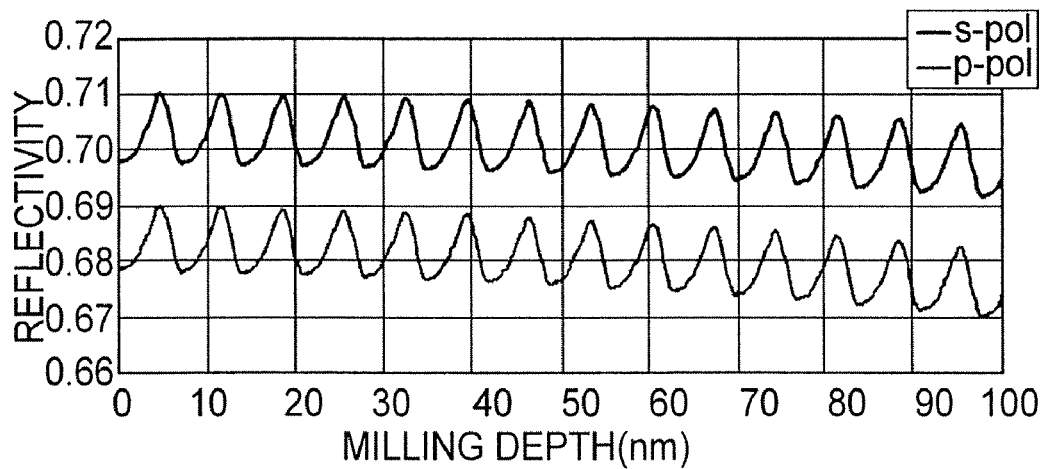
FIGS. 5A, 5B and 5C are graphs, respectively, for explaining advantageous effects of removing an upper layer or layers of a multilayered film.
Figure 5B:
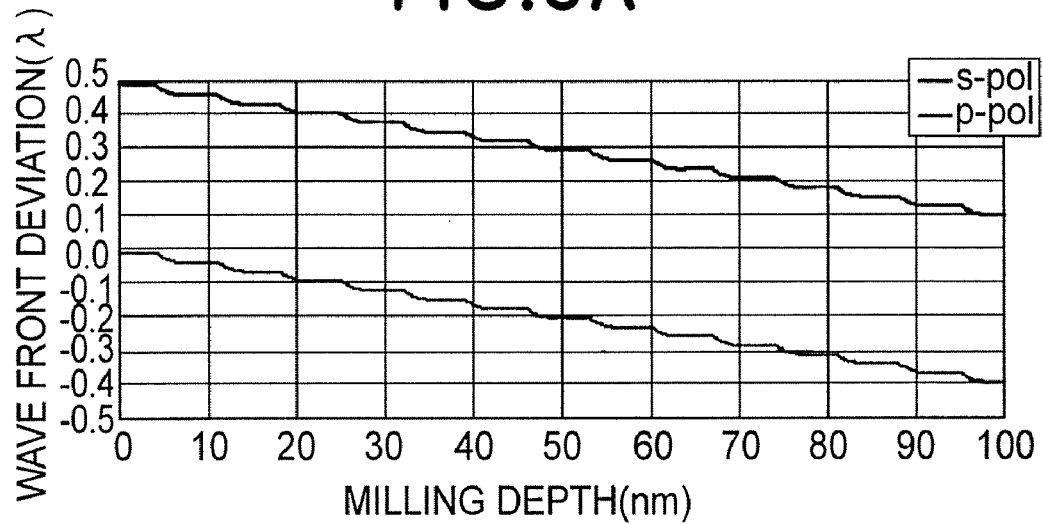

Here, a case where the multilayered film is cut or shaved from its topmost layer will be considered. The amount of cutting the multilayered film is called "milling depth". FIG. 5A is a graph showing the milling depth and the reflectance where EUV light of a wavelength 13.5 nm is incident on an Mo/Si multilayered film mirror at an incidence angle 10 deg., while FIG. 5B is a graph showing the milling depth and the deviation amount of the wavefront. The multilayered film has 60 (sixty) layer pairs, and a period length of 6.99 nm. The ratio of the Mo layer thickness to the period length is 0.4, and the roughness at the interface is 0.7 nm (rms). The calculations were made under the conditions of incidence angle 10 deg., wavelength 13.4 nm, and no polarization.

The graphs illustrate the characteristics of P-polarized light and S-polarized light. Generally, while taking into account the effect of oxidation of Mo, an Si layer is put on the topmost layer. Hence, the calculations were made on condition that the topmost layer is Si layer.

Figure 5C:
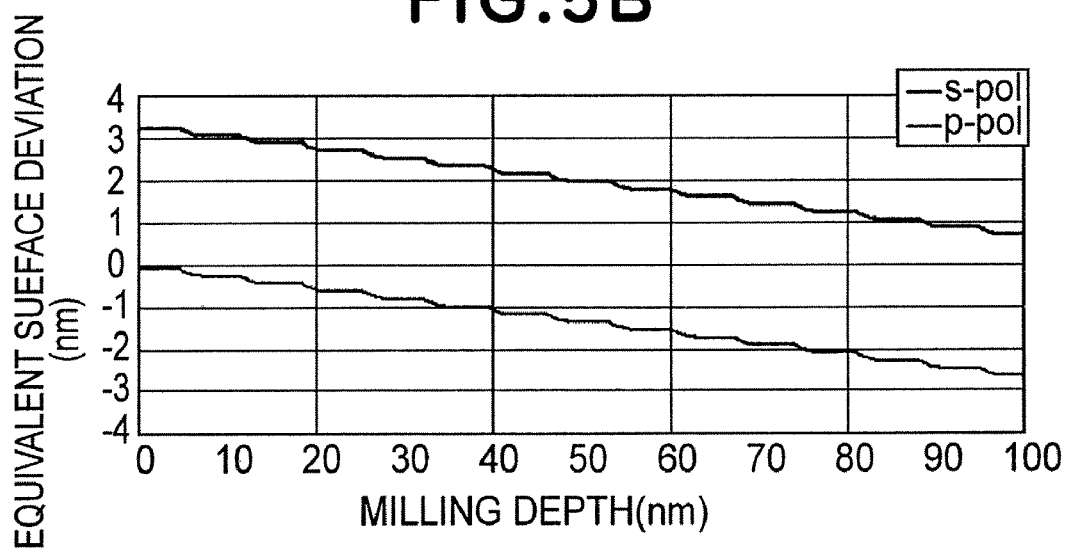

It is seen from FIG. 5B that, by removing one layer pair (=6.99 nm) out of the multilayered film, the wavefront of reflected light displaces by an amount corresponding to about 0.025 wavelength. FIG. 5C is a graph showing the amount of deviation of the wavefront when converted into a spatial deviation of the reflection position. Here, the relationship among the wavelength $\lambda$ of incident light, the deviation amount W of the wavefront, and the spatial deviation L of the reflection position can be given by:

$$\lambda \times W = 2L$$

As long as this example concerns, cutting one layer pair (=6.99 nm) out of the multilayered film is equivalent to displacement of the reflection position by about 0.2 nm. Furthermore, it is seen from FIG. 5A that, when the coating milling is performed, because of the relationship of refractive index, the reflectance and the wavefront in the Mo layer change largely as compared with those in the Si layer. As described hereinbefore, as long as about 60 (sixty) layer pairs are laminated, the reflectance is saturated with respect to the film period. Therefore, by removing just one period film thickness, the reflectance is unchanged but only the wavefront is changed.

From the relationships described above with reference to FIGS. 2-5, it is seen that, when one layer pair, in this example, a pair of one Mo layer and one Si layer (=6.99 nm) is cut, the resultant is equivalent to changing the substrate surface shape of the multilayered film mirror (mirror unit) by about 0.2 nm.

Now, an example wherein light is incident on a multilayered film mirror 60 (FIG. 6A) which comprise a mirror substrate 61 having distorted surface and a uniform multilayered film 62 provided on the substrate, is considered. The surface shape of the multilayered film 60 is distorted due to the influence of the mirror substrate. Therefore, if a parallel wave is incident on the multilayered film mirror 60, the phase of reflection light from a point A is delayed with respect to reflection light from a point B. Hence, the coating milling process is carried out to partially remove the multilayered film to adjust the phases of reflection lights from these points, thereby to control the wavefront of reflection light from the multilayered film mirror 60.

First of all, the coating milling is carried out while taking, as an origin, the point A where the phase delays most. As described hereinbefore, almost no change of wavefront occurs at the Si layer, whereas the wavefront changes largely at the Mo layer. However, the Mo layer is oxidized easily. Therefore, unless a special coating is applied, it is quite difficult to finish the coaling milling at the middle of the Mo layer to adjust the wavefront continuously. Hence, as shown in FIG. 6B, layer pairs each comprising one Mo layer and one Si layer are removed out of the multilayered film to discontinuously adjust the wavefront. Regarding the Si layer, on the other hand, since it has no large influence upon the wavefront, even if the coating milling is finished at the middle of the Si layer, it does not apply a large effect. Where EUV light of a wavelength 13.5 nm is incident with an incidence angle of 10 deg. as described hereinbefore, by removing layer pairs one by one (=6.99 nm thickness) out of the multilayered film, the spatial reflection position, that is, the shape error of the mirror substrate 61 can be corrected each time with a unit of 0.2 nm.

Figure 6A:
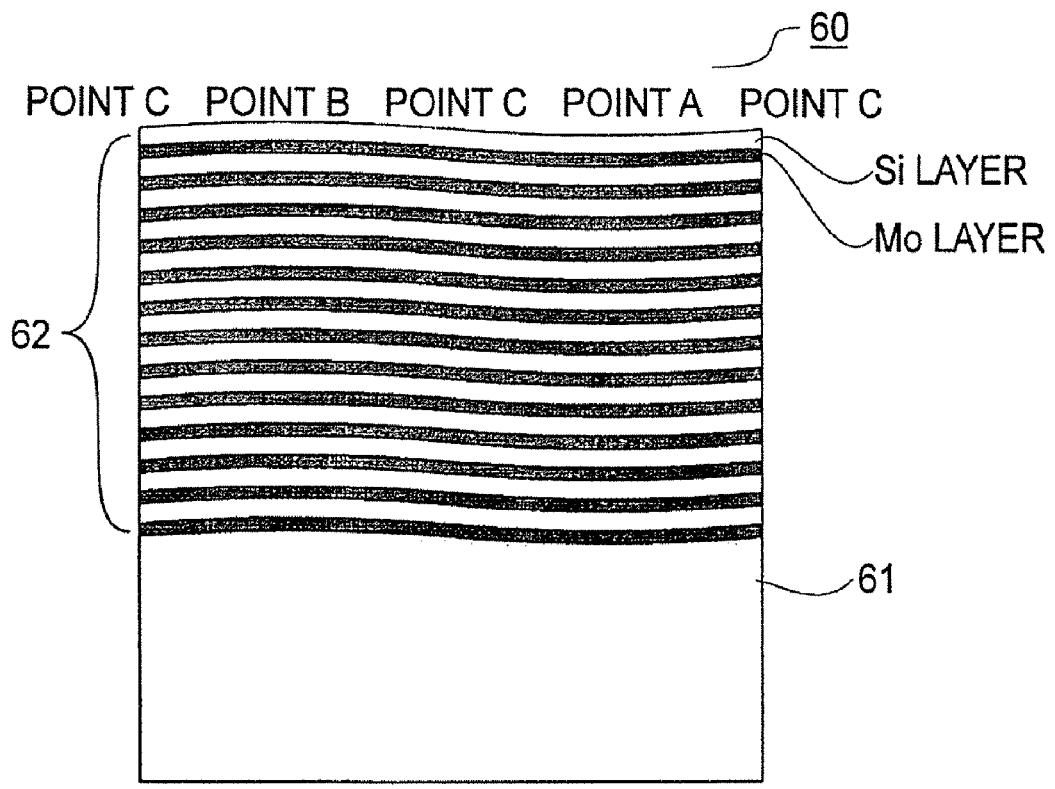
FIGS. 6A and 6B are schematic views, respectively, schematically illustrating the removal of upper layers of a multilayered film.
Figure 6B:
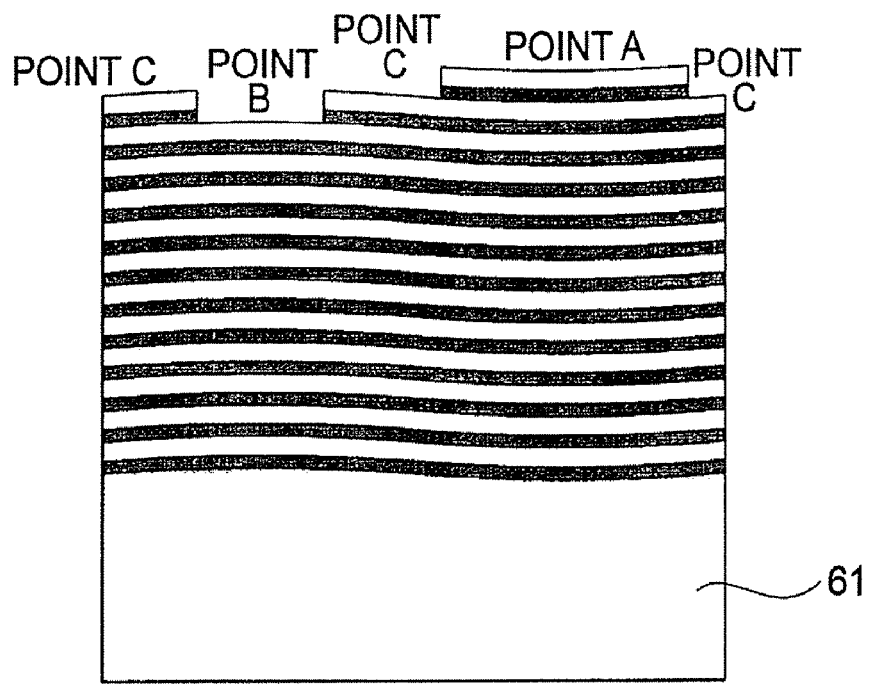

It is now assumed that the shape at point B of the mirror substrate 61 shown in FIG. 6A has a shape error of 0.4 nm with respect to point A, and that point C has a shape error of 0.2 nm. As shown in FIG. 6B, two layer pairs are removed out of the multilayered film at point B and additionally one layer pair is removed from the multilayered film at point C. By doing so, the wavefront aberration attributable to the surface error of the mirror substrate described above can be well corrected.

Figure 7A:
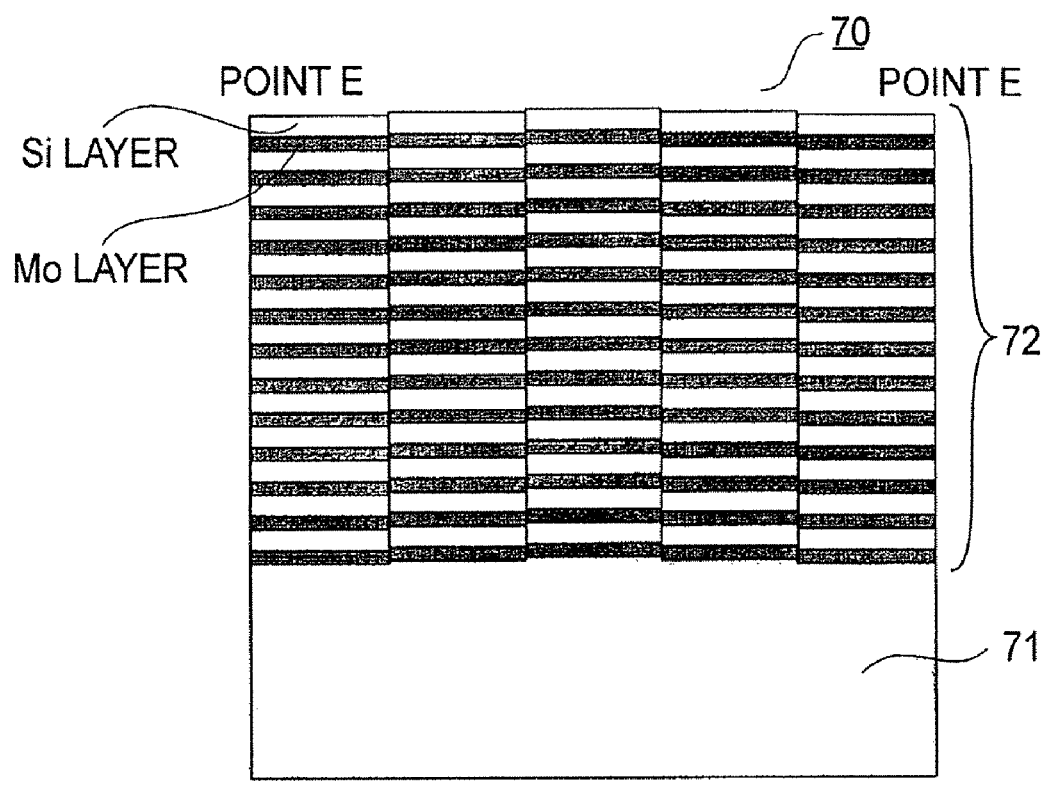
FIGS. 7A and 7B are schematic views, respectively, schematically illustrating the removal of upper layers of a multilayered film.
Figure 7B:
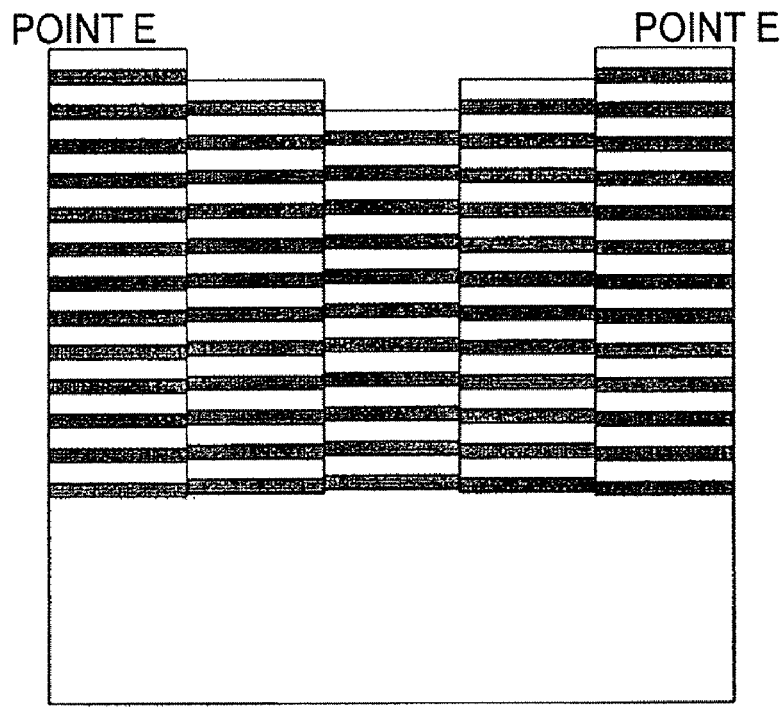

Similarly, a case wherein light is incident on a multilayered film mirror 70 (FIG. 7A) that comprises a mirror substrate 71 having a central portion raised as compared with the peripheral portion thereof, and a uniform multilayered film 72 applied to the mirror substrate, will now be considered. In this example, the phase at point E on the reflection mirror delays most. Thus, the coating milling is carried out while taking the point E as an origin. Where the shape error between the end portion and the central portion of the multilayered film mirror 70 is about 0.4 nm and the error continuously changes therebetween, two layer pairs are removed out of the multilayered film at the central portion. Furthermore, one layer pair is removed from opposite sides of the central portion. By doing so, wavefront aberration attributable to the shape error of the mirror substrate can be well corrected.

Next, preferred embodiments of mirror unit (multilayered film mirror) and optical instrument having the same according to the present invention will be explained.

Embodiment 1

Figure 1:
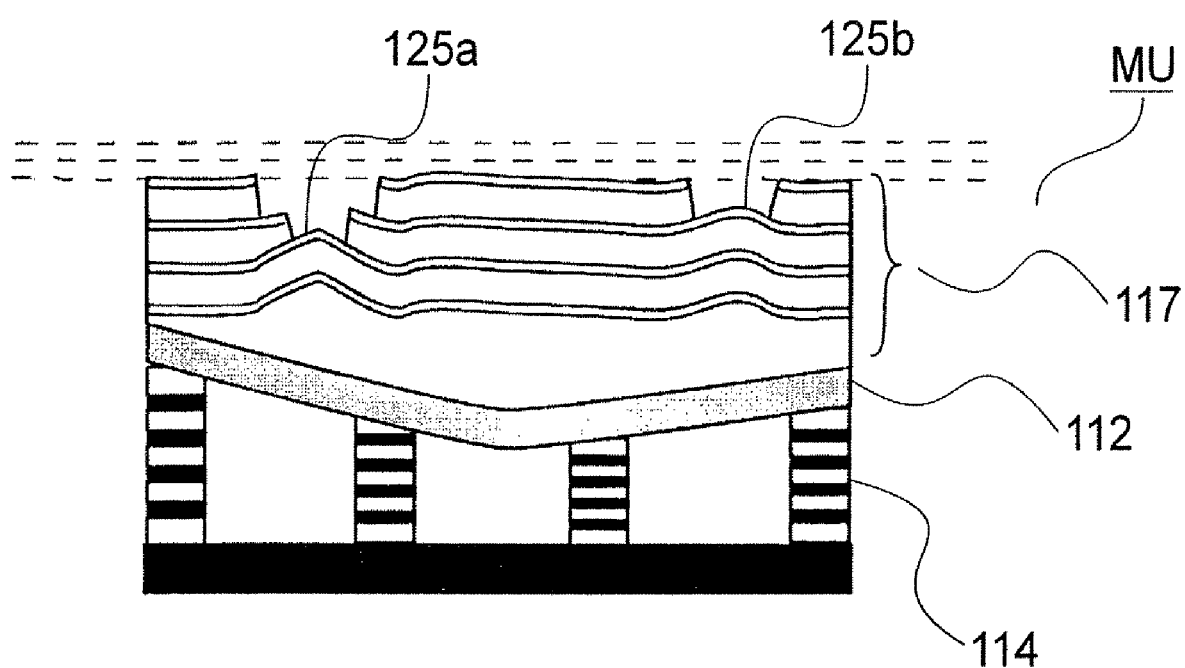
FIG. 1 is a schematic and sectional view of a main portion of a mirror unit according to a first embodiment of the present invention.

FIG. 1 is a schematic and sectional view of a main portion of a mirror unit MU according to a first embodiment of the present invention. FIGS. 14 and 15A-15C are schematic and sectional views, respectively, for explaining various states of a mirror unit (multilayered film mirror) MU according to the first embodiment, during the production process thereof.

Figure 15A:
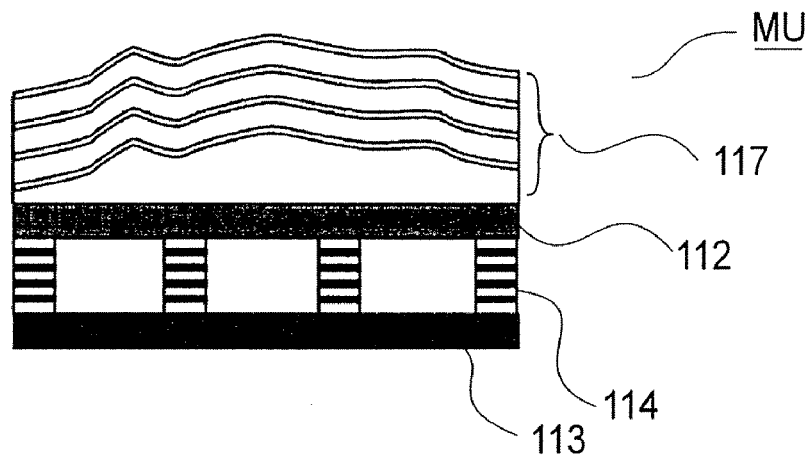
FIGS. 15A, 15B and 15C are schematic views, respectively, for explaining the first embodiment of the present invention.
Figure 15B:
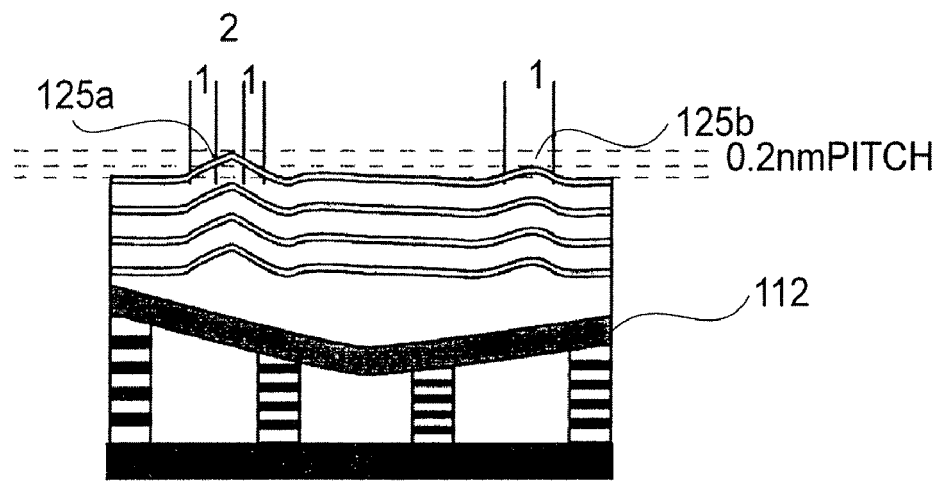
Figure 15C:
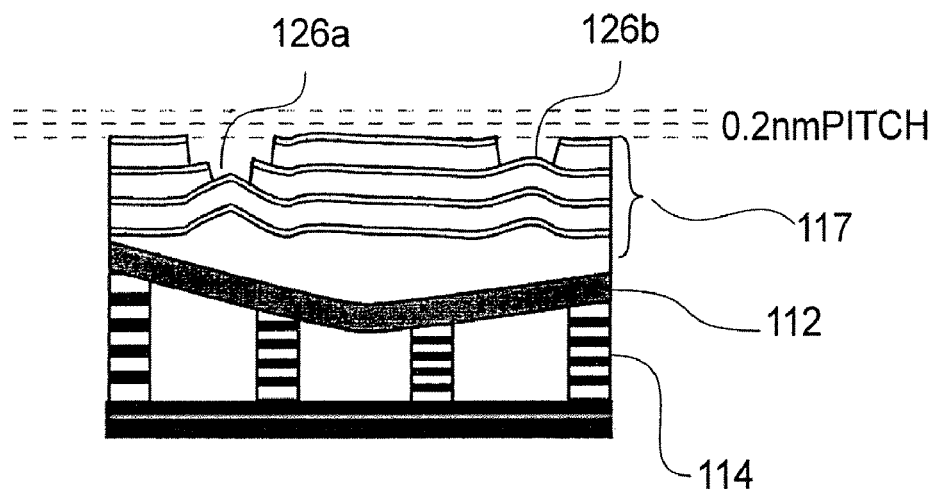
Figure 16:
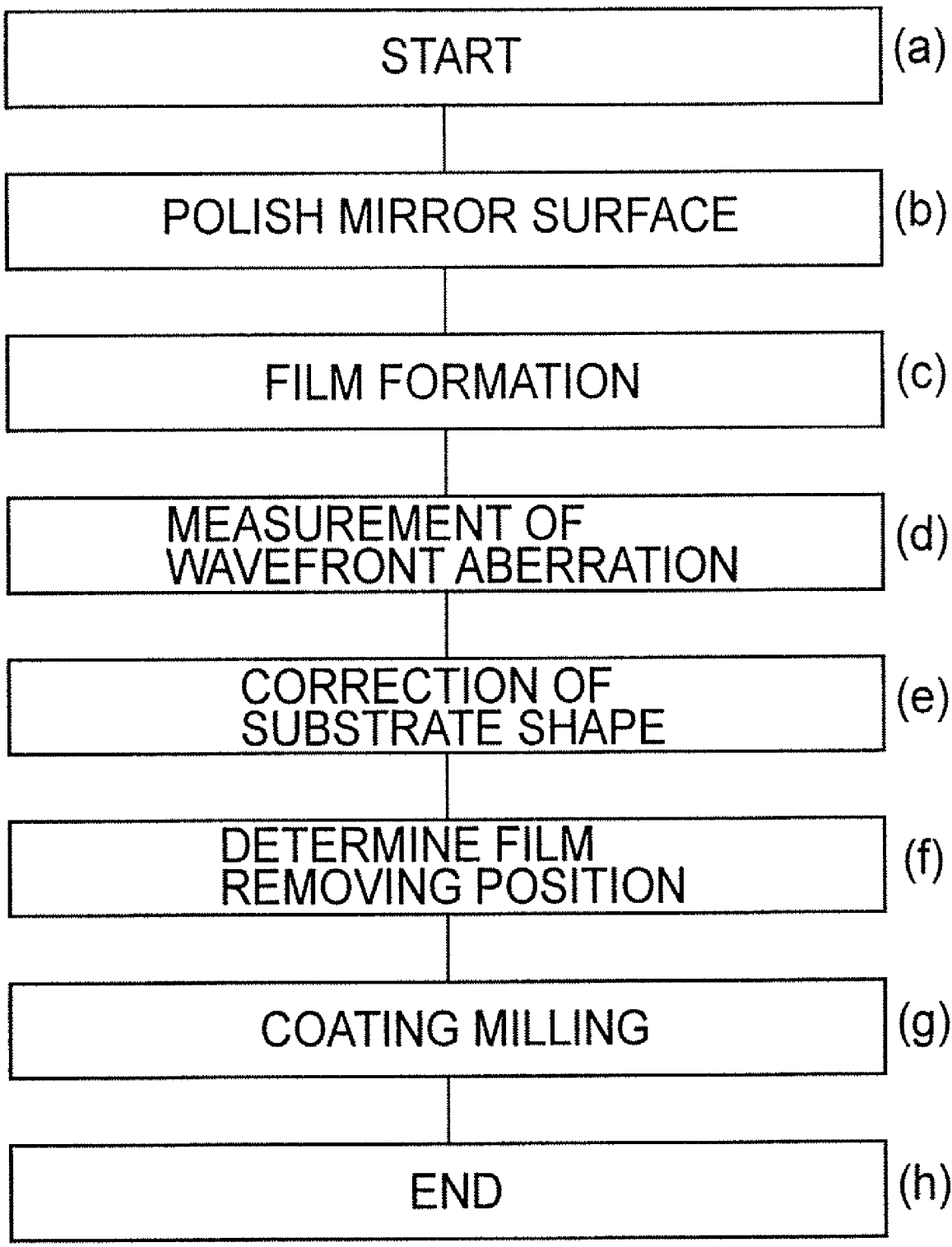
FIG. 16 is a flow chart for explaining the procedure of a mirror producing method according to the first embodiment of the present invention.

FIG. 16 is a flow chart for explaining a method of producing a mirror unit according to the present invention. Here, FIGS. 15A-15C are sectional views of the mirror unit MU each corresponding to a certain stage in the procedure shown in FIG. 16.

The mirror unit MU as shown in FIGS. 1 and 15C is in the state in which deformation of a substrate 112 has been adjusted by means of an actuator 114 and coating milling means (film removing means) and thus the adjustment has been completed.

In this embodiment, one surface of the substrate 112 is a reflection surface on which a multilayered film 117 is provided. At a surface opposite to that one surface, there is substrate deforming means 114 effective to partially or locally deform the shape of the substrate 112. Furthermore, the multilayered film 117 is removed partially from its topmost layer (the layer at the outermost side of the multilayered film applied to the mirror) up to one or more layers, from the topmost layer.

Figure 14:
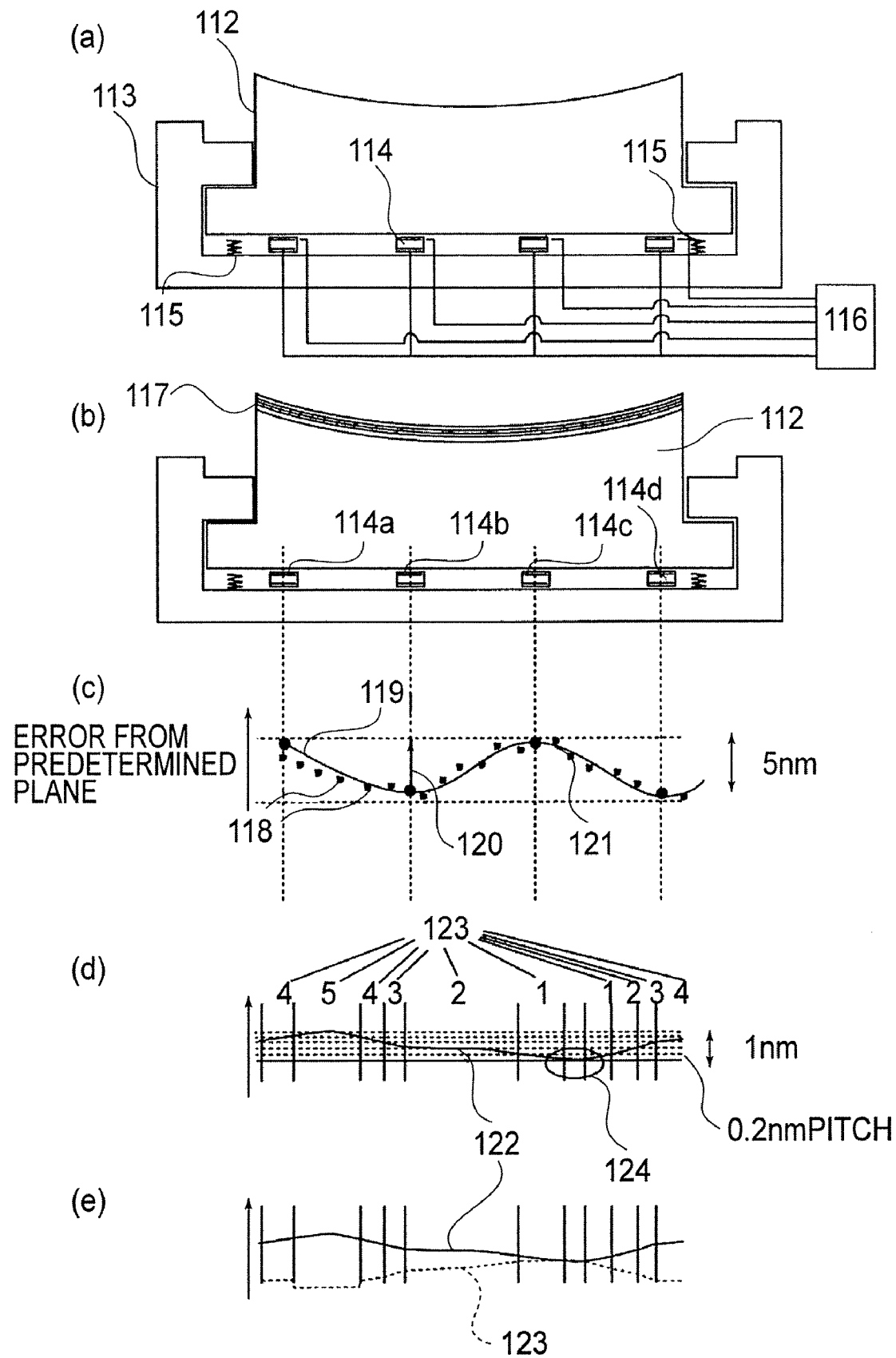
FIG. 14 is a schematic view for explaining the procedure of forming a mirror unit in accordance with a first embodiment of the present invention.

In FIGS. 1, 14 and 15, denoted at 112 is a substrate, and denoted at 117 is a multilayered film formed on the substrate 112. Denoted at 113 is a member having high rigidity, and it holds the substrate 112. Denoted at 114 are actuators (substrate deforming means) for deforming the substrate. Denoted at 116 is a controller for controlling the actuator 114 operation.

The high-rigidity member 113 and the actuators 114 may be attached before the film formation, or they may be attached after the film formation. The substrate 112 is held fixed by applying a force thereto from a side remote from the reflection surface thereof, by means of springs 115.

FIG. 14, part (a), depicts the mirror unit in the state in which the polishing of the mirror surface of the substrate 112 has been completed and it has been attached to the high-rigidity member 113. This corresponds to step (b) of the flow chart of FIG. 16.

FIG. 14, part (b), depicts the mirror unit in the state in which the film formation of the multilayered film 117 upon the substrate 112 has been completed. This corresponds to step (c) of FIG. 16.

FIG. 14, part (c), depicts the state in which the error of film thickness with reference to a predetermined plane has been detected, and this corresponds to step (d) of FIG. 16. Here, the predetermined plane may be an ideal plane determined by design values, for example.

FIG. 14, part (d), depicts the state in which only the shape correction for the substrate 112 based on actuators 114 has been carried out and the film removing position has been determined. This corresponds to steps (e) and (f) of FIG. 16.

FIG. 14, part (e), depicts the state in which a portion of the multilayered film 117 has been removed by the film removing method and the wavefront has been corrected thereby. This corresponds to step (g) of FIG. 16.

FIG. 15A depicts the state in which the film formation of the multilayered film 117 as well as the wavefront aberration measurement have been completed. This corresponds to steps (c) and (d) of FIG. 16.

FIG. 15B depicts the state in which the shape of the substrate 112 has been corrected by the substrate deforming means, and this corresponds to step (e) of FIG. 16. In FIG. 15B, portions denoted at 125a and 125b are those zones in which the film portions at the topmost layer and adjacent the topmost layer have to be removed.

FIG. 15C depicts the state in which the film portions at and adjacent the topmost layer in the zones 125a and 126b of the multilayered film 117 have been removed, and the wavefront aberration has been corrected.

As regards the substrate 112, use of a super-low-expansion material such as "ZERODURE" (registered trade mark) may be preferable. As regards the material of the high-rigidity member 113, ceramics having high rigidity may be preferable. As regards the actuators 114, use of piezoelectric devices may be preferable as an example. With piezoelectric devices, even very minute displacement can be controlled and, additionally, when they are stacked, a large displacement amount can be secured. As a further alternative, a piezoelectric device and a hinge spring may be used in combination to constitute a fine-motion mechanism.

As regards the mirror surface of the substrate 112, deformation to be produced when the same is attached to the high-rigidity member 113 may be taken into account, and the surface may be polished in such state in which the substrate has been mounted onto the high-rigidity member 113 and no electric voltage is applied to the piezoelectric devices 114. The polishing may be continued until the error (surface irregularity) with respect to a surface as designed becomes approximately equal to 3 nm. The polishing with a precision of about 3 nm error may be attained relatively easily.

The number of the piezoelectric devices 114 may vary in accordance with the order of deformation to be produced in the substrate 112, for example. In this embodiment, four piezoelectric devices are disposed at sectional positions in the diameter direction so as to correct deformation of an order having a similar period like the size of the mirror. Actually, there are many piezoelectric devices which are distributed two-dimensionally along the whole curved surface, but only a few are illustrated in the drawings for simplicity.

The actuators 104 are provided in accordance with the deformation mode of the substrate 101. For example, if it is desired to correct up to a displacement of one-period length mode throughout the whole mirror surface, by means of deforming the substrate 101, use of at least four actuators will be sufficient. However, if it is desired to correct deformation of higher deformation mode, more actuators should desirably be used.

Figure 12:
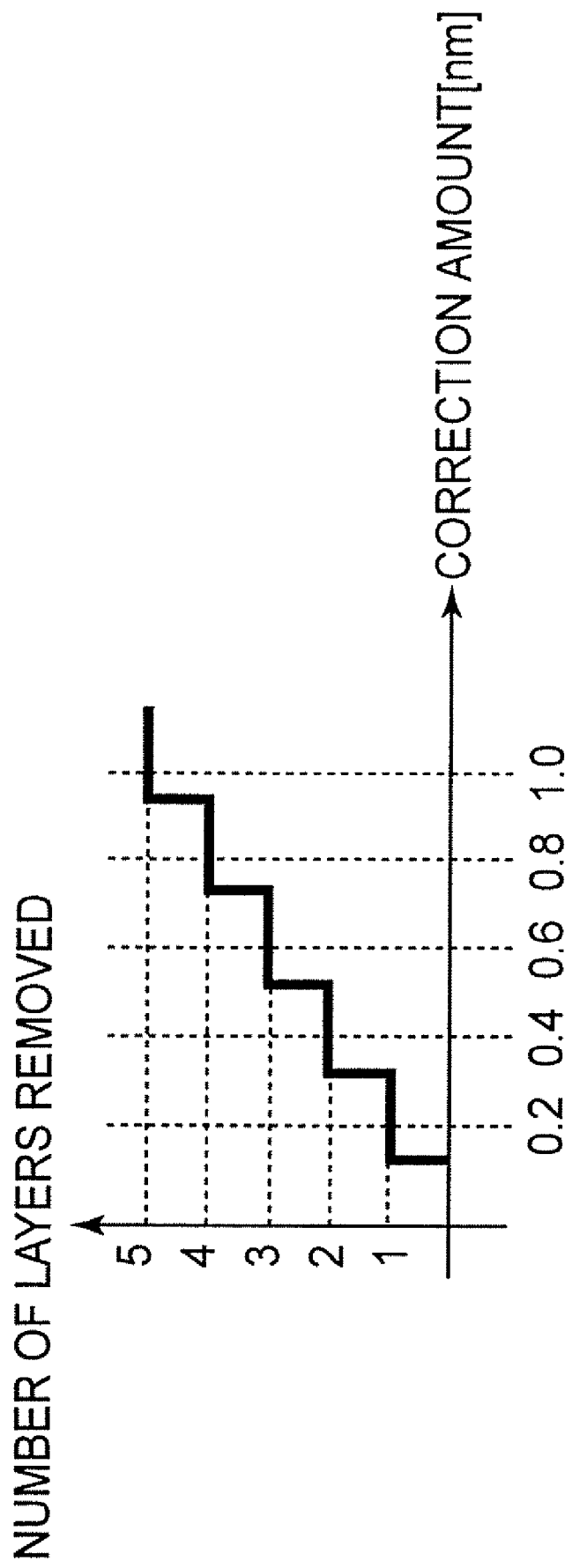
FIG. 12 is a graph for explaining the relationship between the amount of correction and the number of layers to be removed.
Figure 13A:
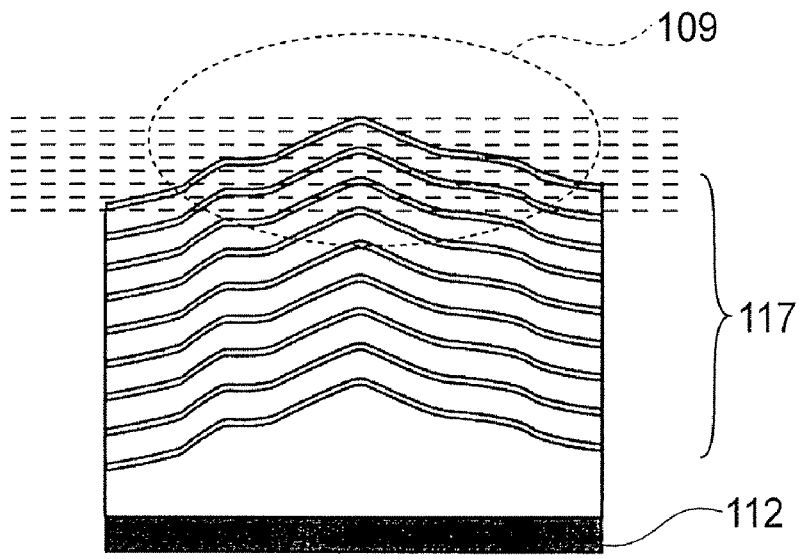
FIGS. 13A, 13B and 13C are schematic views, respectively, for explaining correction made to a mirror having a film formed thereon, on the basis of film partial removing method only.
Figure 13B:
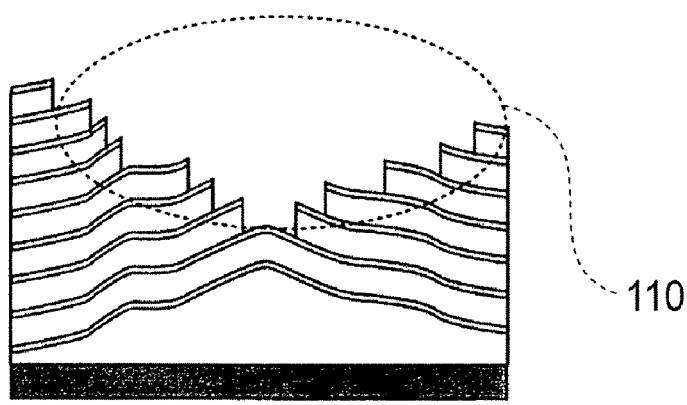
Figure 13C:
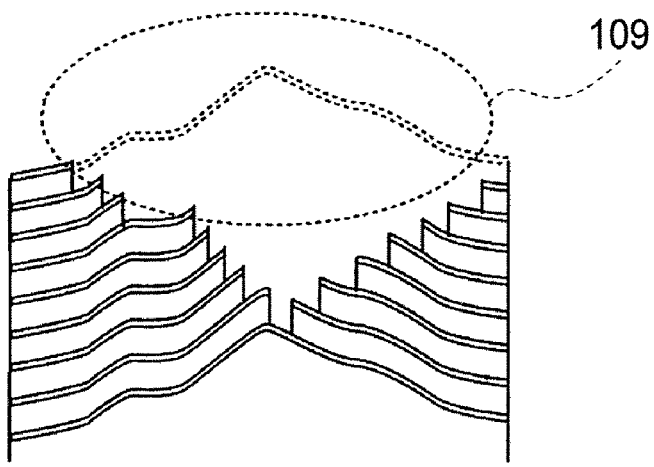

The multilayered film 102 comprises Mo/Si multilayered film (each layer pair is 6.99 nm) including about sixty (60) layer pairs being laminated in layers. This is because, in addition to forty layer pairs with which a sufficient reflectance is obtainable, twenty (20) layer pairs are added so as to prevent decrease of reflectance even if the multilayered film is cut by coating milling. Namely, the number of layers to be cut is not less than one (1) and not greater than twenty (20).

Where a portion of the surface of the multilayered film 117 is removed, there is a relationship between the amount of correction (nm) and the number of layers to be removed, such as shown in FIG. 12. Although FIG. 12 concerns a case of a Mo/Si multilayered film (one layer pair is 6.99 nm) and one layer pair should be removed for every 0.2 nm correction, the value may vary in dependence upon the type (used materials) of the multilayered film.

Briefly, in accordance with this embodiment of the present invention, a multilayered film mirror is produced through (i) a multilayered film forming step for forming a multilayered film 117 upon the surface of a substrate 112 to provide a reflection surface, (ii) a substrate deforming step for changing the shape of the substrate 112, and (iii) a multilayered film removing step for partially removing the multilayered film 117 on the mirror surface.

Next, the correction procedure based on lower-order deformation and higher-order deformation will be explained in detail.

FIG. 14, part (c), depicts the state in which an error from a predetermined surface (design surface) has been measured on the basis of wavefront aberration measurement made to the reflected wavefront from a multilayered film mirror, and error or deviation points 118 from design idealistic values at respective points have been determined (step (d) of FIG. 16). By approximating these deviation points with a curve that can be corrected by the substrate deforming means, an approximation curve 119 is obtained. The wavefront aberration measurement for the reflected wavefront may be carried out by use of an interferometer, for example.

Subsequently, a most protruded (projected) position 121 in the approximation curve 119 is detected. Since a piezoelectric device can apply a force only in a pushing direction, the most protruded position may be taken as a reference and another portion concaved or less protruded as compared with the most protruded portion may be pushed by it. For example, the piezoelectric device 114b may be used to perform the correction by an amount corresponding to the length 120 shown in the drawing. With the correction based on the piezoelectric devices, the wavefront error can be reduced to about 1 nm. Thus, at step (e), the substrate 112 is deformed to correct "lower order deformation".

Subsequently, at steps (f) and (h), the amount of deformation 122 shown in FIG. 14, part (d), not corrected by the deformation by the piezoelectric devices, is corrected by using film removing means (coating milling process). At this time, a most concaved position 124 in the curve 122 is detected (step (f)) and, from this, the number of layers to be removed is determined in accordance with the graph of FIG. 12. Then, by using the film removing means, in a predetermined region the film portion corresponding to the determined number of layers is removed (step (h)).

Since in FIG. 14 the number of layers to be removed is large, a more simplified example will be explained in conjunction with FIGS. 15B and 15C. In FIG. 15B, the portion denoted at 125a needs correction by two layer pairs at 0.2 nm pitch. The portion denoted at 125b needs correction by one layer pair. Hence, as shown in FIG. 15C, the films at these portions are removed by coating milling. With this procedure, "higher order deformation" is corrected.

With the procedure according to the first embodiment as described above, the wavefront of light reflected by the multilayered film mirror can be adjusted.

Embodiment 2

Figure 17A:
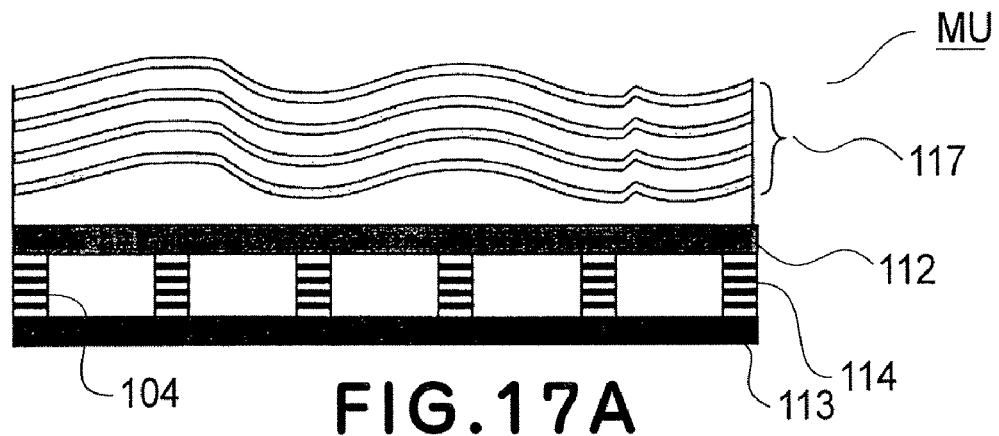
FIGS. 17A, 17B, 17C and 17D are schematic views, respectively, for explaining the procedure of forming a mirror unit in accordance with a second embodiment of the present invention.
Figure 17B:
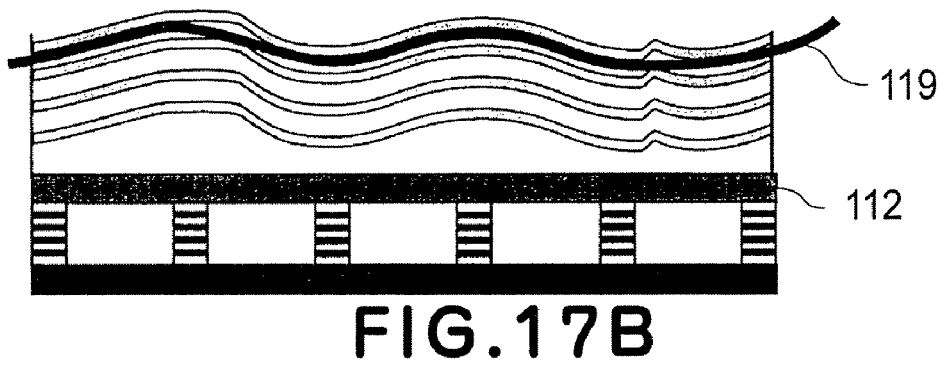
Figure 17C:
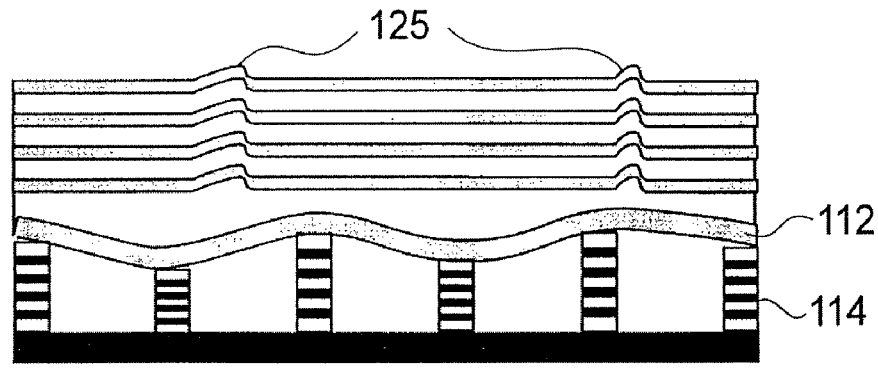
Figure 17D:
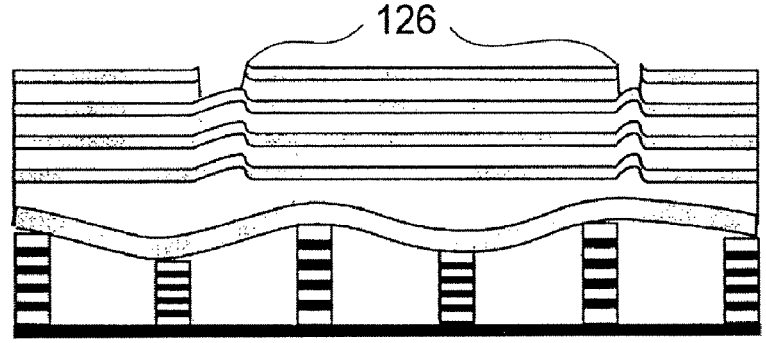

FIGS. 17A-17D are schematic and sectional views of a main portion of a mirror unit MU according to a second embodiment of the present invention. Among these drawings, FIG. 17A depicts the state in which deformation amounts at various points on a multilayered film 17 have been measured. FIG. 17B depicts the state in which, by approximating the deformation amounts with a lower-order periodic function, an approximation curve 119 has been determined. FIG. 17C depicts the state in which deformation of a substrate 112 has been carried out in accordance with the function of approximation curve 119. In the state of FIG. 17C, lower order deformation being larger than the period of mirror surface size has been corrected by use of substrate deforming means 113. FIG. 17D depicts the state in which higher order deformation not corrected by the substrate deforming means 114 has been corrected by means of a coating milling process. In the state of FIG. 17D, deformation having a period of a size not correctable with the substrate deforming means 114 is well corrected.

In accordance with this embodiment of the present invention, correction of at least a phase having a period length the same as or approximately the same as the mirror size is carried out by use of substrate deforming means, while deformation of a period length which is shorter than it is corrected on the basis of coating milling. With this procedure, a mirror unit having its wavefront aberration well corrected is accomplished.

Embodiment 3

FIGS. 18A-18D are schematic and sectional views of a main portion of a mirror unit MU according to a third embodiment of the present invention. In this embodiment, thirteen (13) piezoelectric devices 114 are disposed in a radial direction of the mirror, such that correction with respect to smaller wavelength as compared with the second embodiment of FIGS. 17A-17D, that is, correction of as phase of a period length at least greater than a half of the mirror size is carried out by use of the substrate deforming means.

Thus, in accordance with this embodiment of the present invention, correction of a phase of a period length at least greater than a half of the mirror size is carried out on the basis of substrate deforming means, while deformation of a period which is length shorter than it (e.g. deformation of a period length not greater than 1/10) is corrected by coating milling.

Figure 18A:
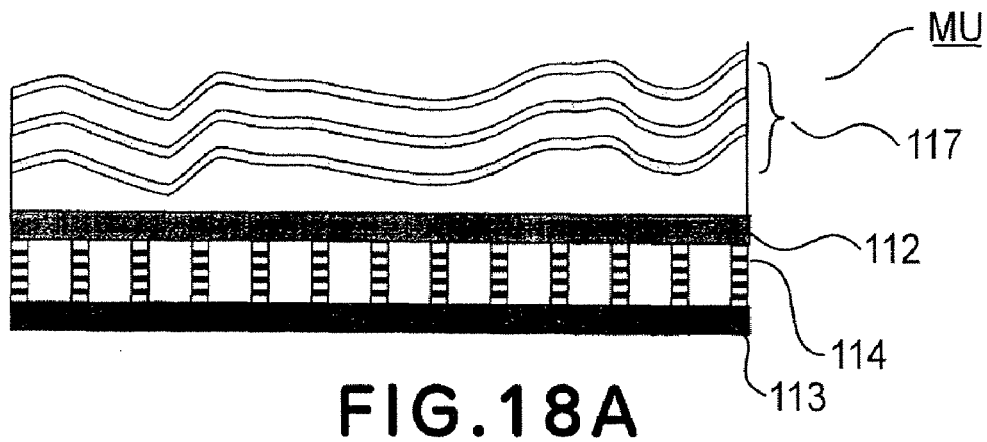
FIGS. 18A, 18B, 18C and 18D are schematic views, respectively, for explaining the procedure of forming a mirror unit in accordance with a third embodiment of the present invention.
Figure 18B:
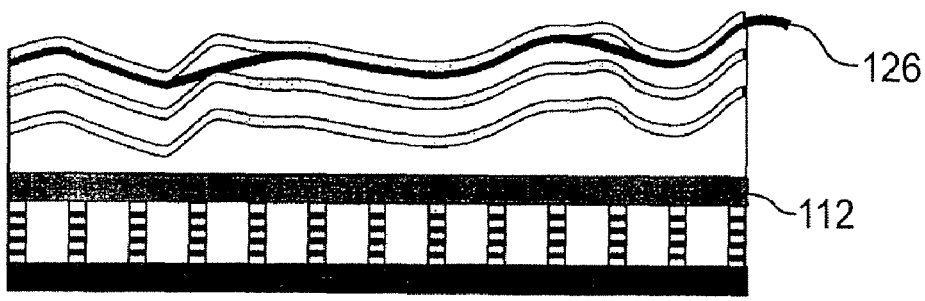
Figure 18C:
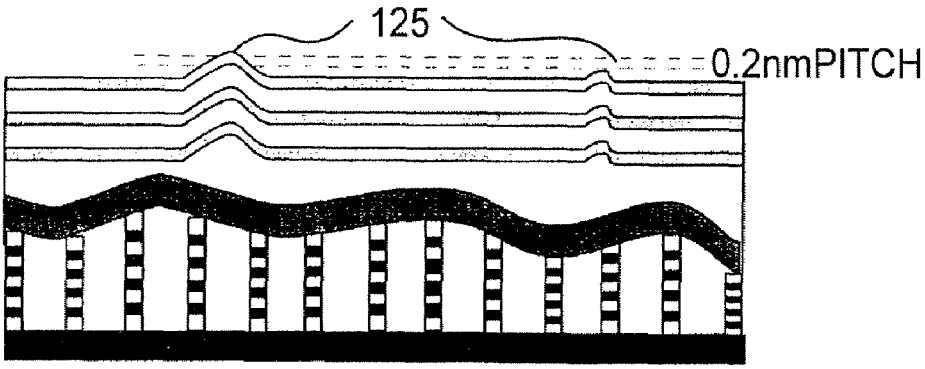
Figure 18D:
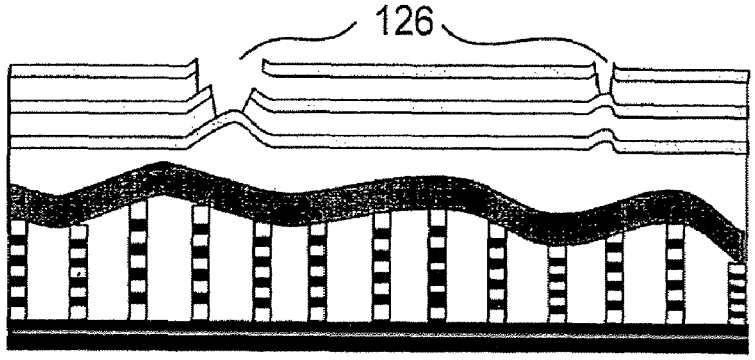

Here, FIG. 18A depicts the state in which deformation amounts at various points on a multilayered film 17 have been measured through wavefront aberration measurement. FIG. 18B depicts the state in which, by approximating the deformation amounts with a lower-order periodic function, an approximation curve 126 has been determined. FIG. 18C depicts the state in which deformation of a substrate 112 has been carried out in accordance with the function of approximation curve 126. In the state of FIG. 18C, deformation being larger than the period of mirror surface size has been corrected by use of substrate deforming means 114. FIG. 18D depicts the state in which higher order deformation not corrected by the substrate deforming means 114 has been corrected by means of a coating milling process. In the state of FIG. 18D, deformation having a period of a size not correctable with the substrate deforming means 114 is well corrected.

In accordance with this embodiment of the present invention, correction of at least a phase having a period length greater than the mirror size is carried out by use of substrate deforming means, while deformation of a period length which is shorter than it is corrected on the basis of coating milling. With this procedure, a mirror unit having its wavefront aberration well corrected is accomplished.

Furthermore, in this embodiment, when light of a wavelength $\lambda$ is incident on the mirror reflection surface, any deformation of the reflection surface of a substrate 112 in relation to such region in which the wavefront of reflected light has an error not less than $\lambda/2$ is corrected by using the substrate deforming means 114. Concerning the region on the substrate 112 in which the wavefront error is smaller than it, correction is carried out by means of partial removal of film layers of the multilayered film 117.

Embodiment 4

Figure 19A:
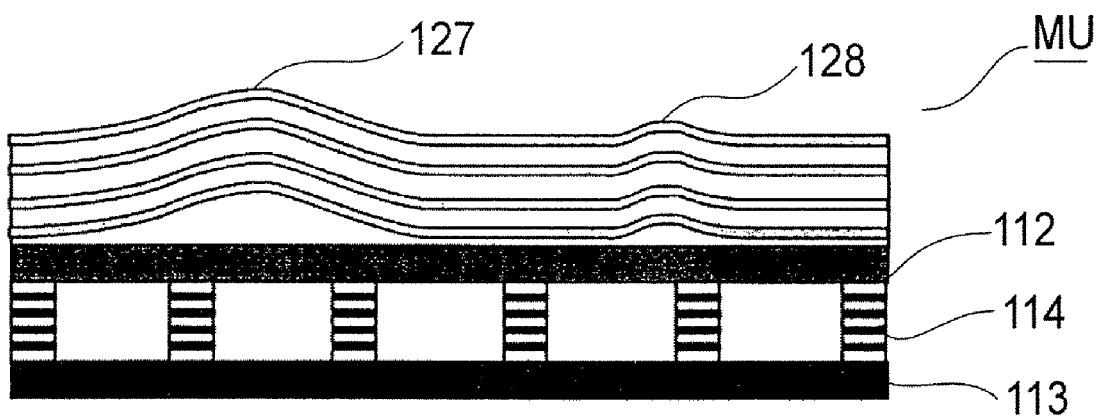
FIGS. 19A, 19B, and 19C are schematic views, respectively, for explaining the procedure of forming a mirror unit in accordance with a fourth embodiment of the present invention.
Figure 19B:
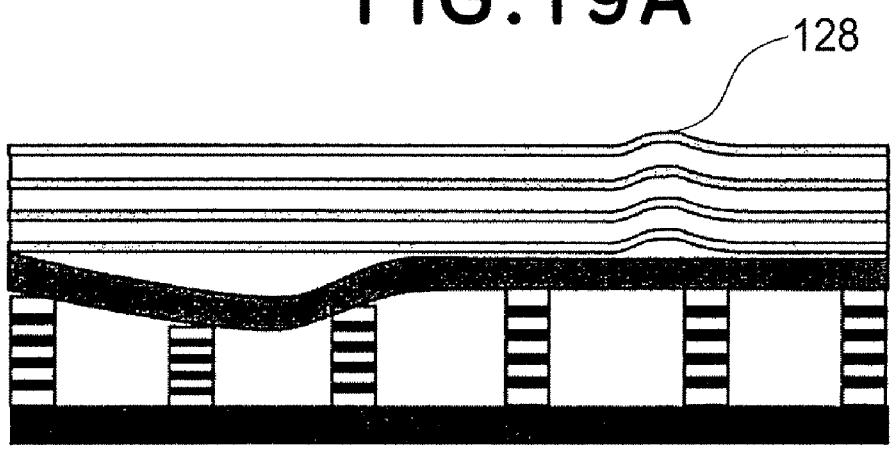
Figure 19C:
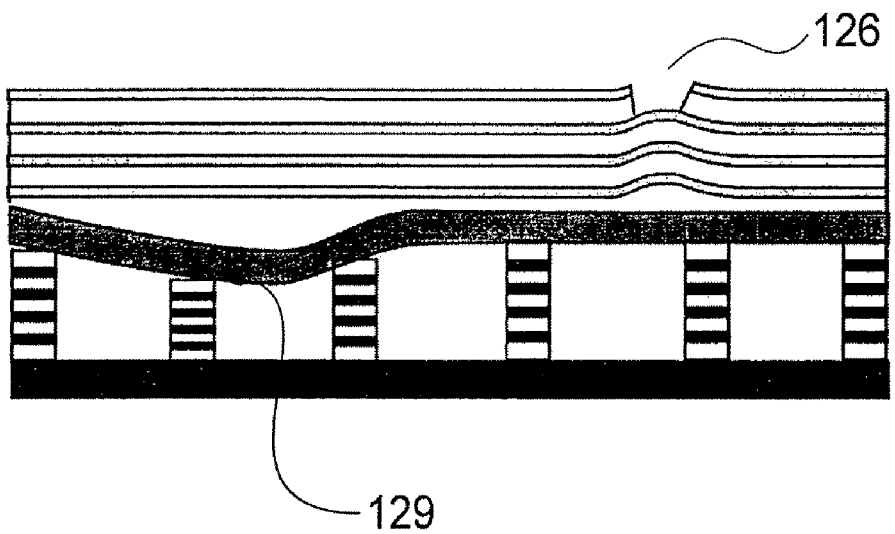

FIGS. 19A-19C are schematic and sectional views, respectively, of a main portion of a mirror unit MU according to a fourth embodiment of the present invention. Here, FIG. 19A depicts the state in which the surface shape has been measured through wavefront aberration measurement. In FIG. 19A, the portion denoted at 127 is a portion having large deformation, and the portion denoted at 128 is a portion having small deformation. FIG. 19B depicts the state in which the large deformation at 127 has been corrected through the substrate deforming means 114. FIG. 19C depicts the state in which the remaining deformation at 128 has been corrected by means of a coating milling process.

Thus, in accordance with this embodiment of the present invention, correction of deformation having a larger deformation amount is carried out by use of substrate deforming means, while deformation of a smaller deformation amount is corrected on the basis of coating milling. With this procedure, a mirror unit having its wavefront aberration well corrected is accomplished.

In this embodiment as described above, after deformation of the substrate is produced through the substrate deformation process, the wavefront aberration measurement is carried out and, on the basis of the measured results, a portion or portions of the multilayered film are removed. With this procedure, a mirror unit (multilayered film mirror) is produced.

Embodiment 5

Figure 20A:
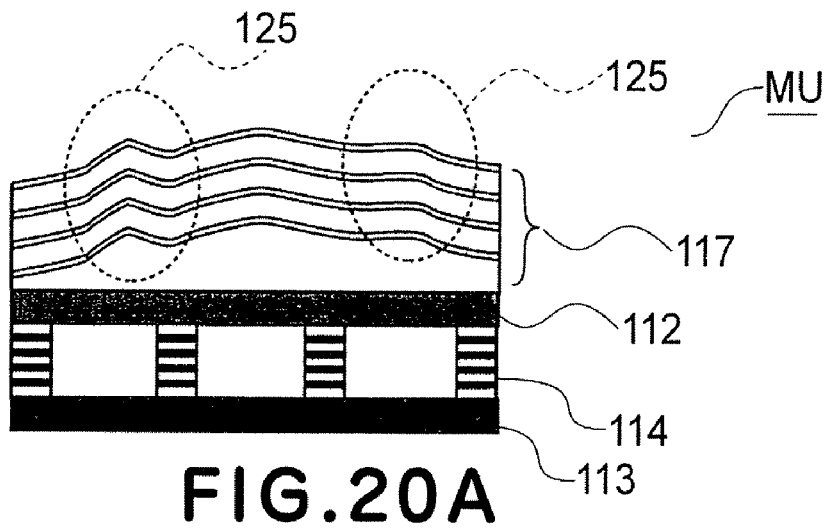
FIGS. 20A, 20B, and 20C are schematic views, respectively, for explaining the procedure of forming a mirror unit in accordance with a fifth embodiment of the present invention.
Figure 20B:
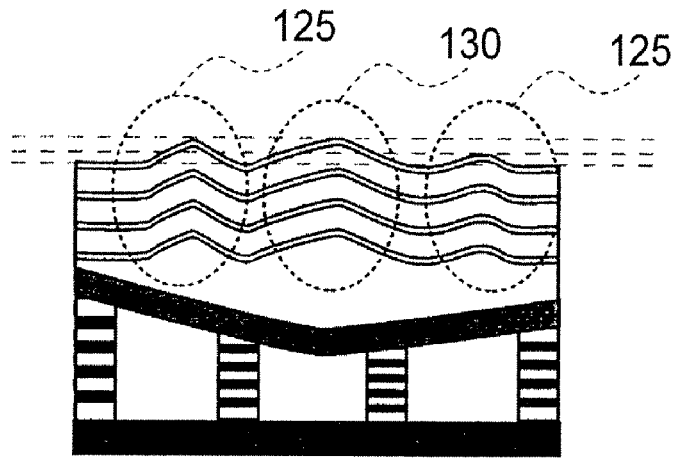
Figure 20C:
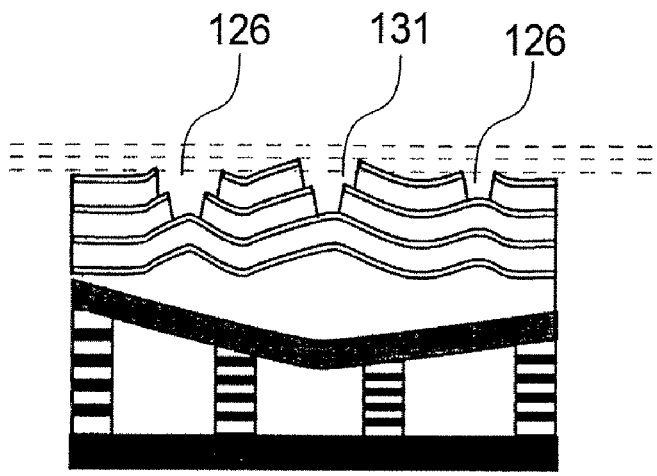

FIGS. 20A-20C are schematic and sectional views, respectively, of a main portion of a mirror unit MU according to a fifth embodiment of the present invention. FIG. 20A depicts the state in which the surface shape of a multilayered film 117 has been corrected by substrate deforming means. Here, there is a possibility that, as shown at portion 130 in FIG. 20B, deformation of the substrate 112 by the substrate deforming means may cause additional deformation. The portion denoted at 131 in FIG. 20C depicts that such deformation (130) has been corrected by film removing means. Thus, in accordance with this method, even if additional deformation is created by the correction (deformation) through the substrate deforming means, it can be well corrected.

Any additional deformation to be produced due to the correction (deformation) through the substrate deforming means can be detected by calculation or, alternatively, it may be detected on the basis of wavefront aberration measurement performed again after the correction through the substrate deforming means.

In accordance with this embodiment of the present invention, the wavefront aberration including one produced as a result from a change in shape of the substrate 112, produced through the correction by the substrate deforming means, can be corrected by means of partially removing the multilayered film 117.

Figure 21:
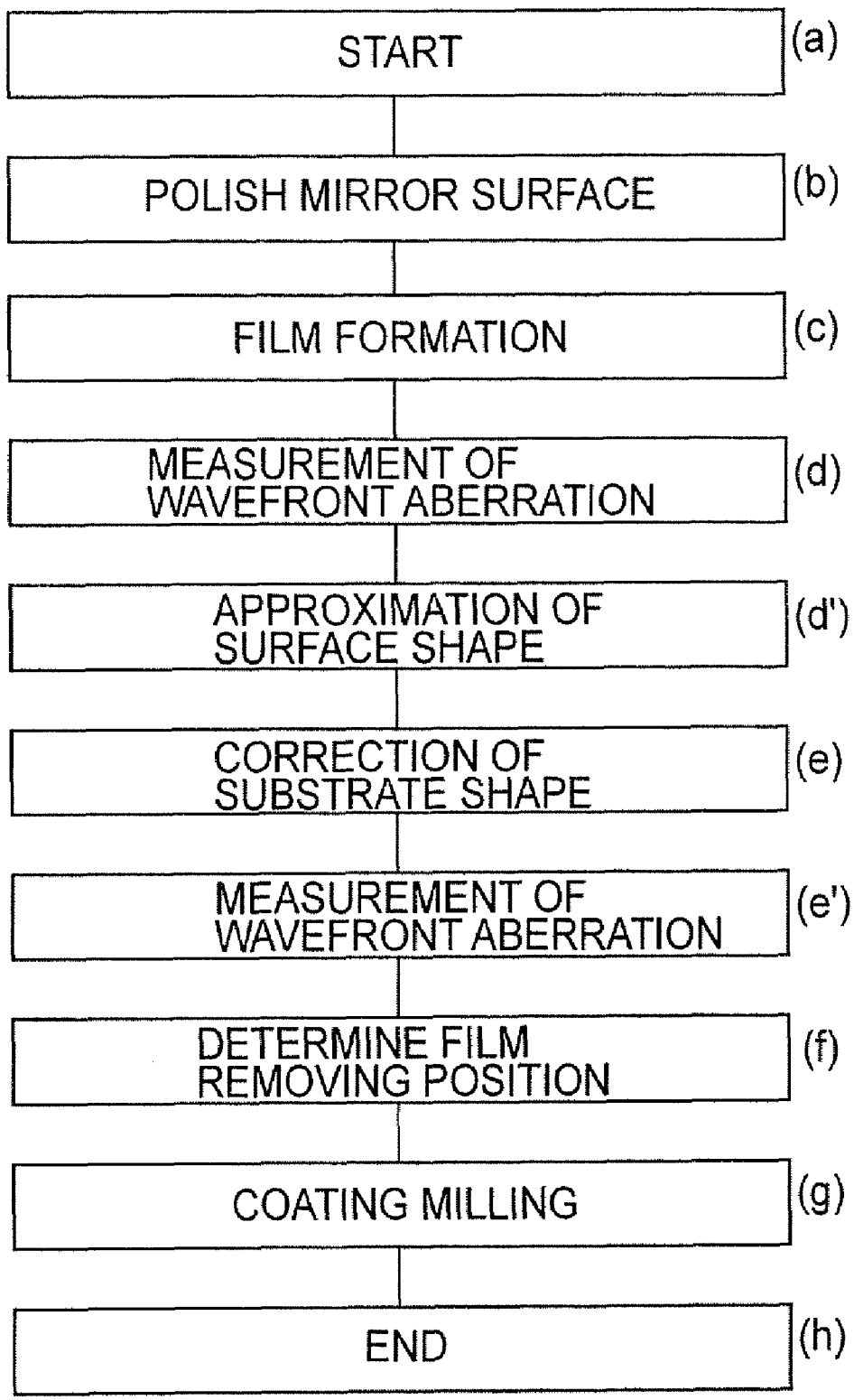
FIG. 21 is a flow chart for explaining the procedure of a mirror producing method according to the fifth embodiment of the present invention.

FIG. 21 is a flow chart for explaining the procedure of this embodiment described above. As compared with the flow chart of FIG. 16, it differs in that the surface shape approximation at step (d') follows the wavefront aberration measurement at step (d), and that wavefront aberration measurement is carried out again at step (e') between the correction with piezoelectric device at step (e) and the film removing means at step (f). The remaining portion is essentially the same as the FIG. 16 procedure.

In accordance with the embodiments of the present invention as described above, a mirror unit of small wavefront aberration and large reflectance can be produced without complicated procedure.

Embodiment 6

Figure 8:
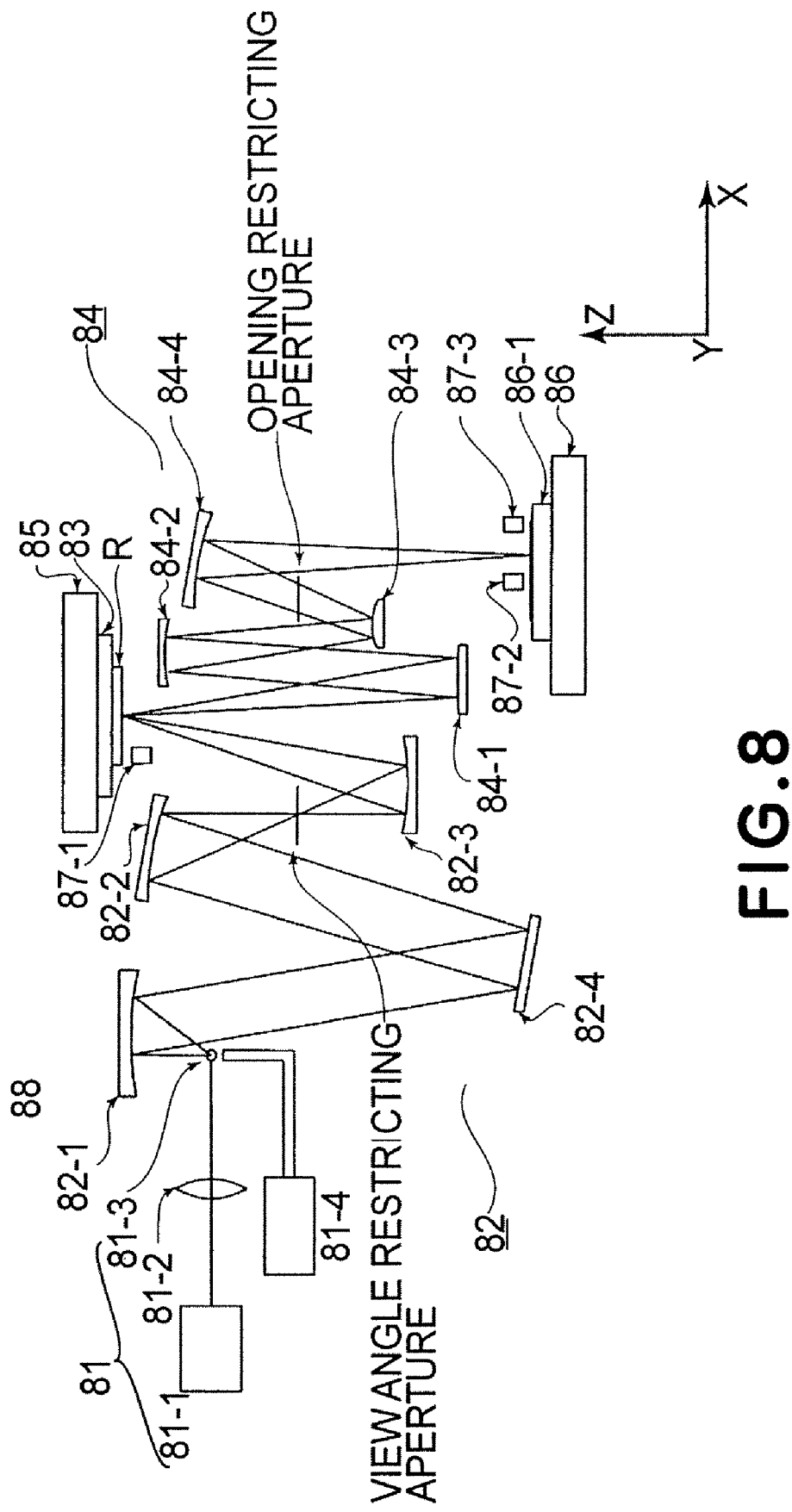
FIG. 8 is a schematic view of a main portion of an EUV exposure apparatus according to an embodiment (sixth embodiment) of the present invention.
Figure 9:
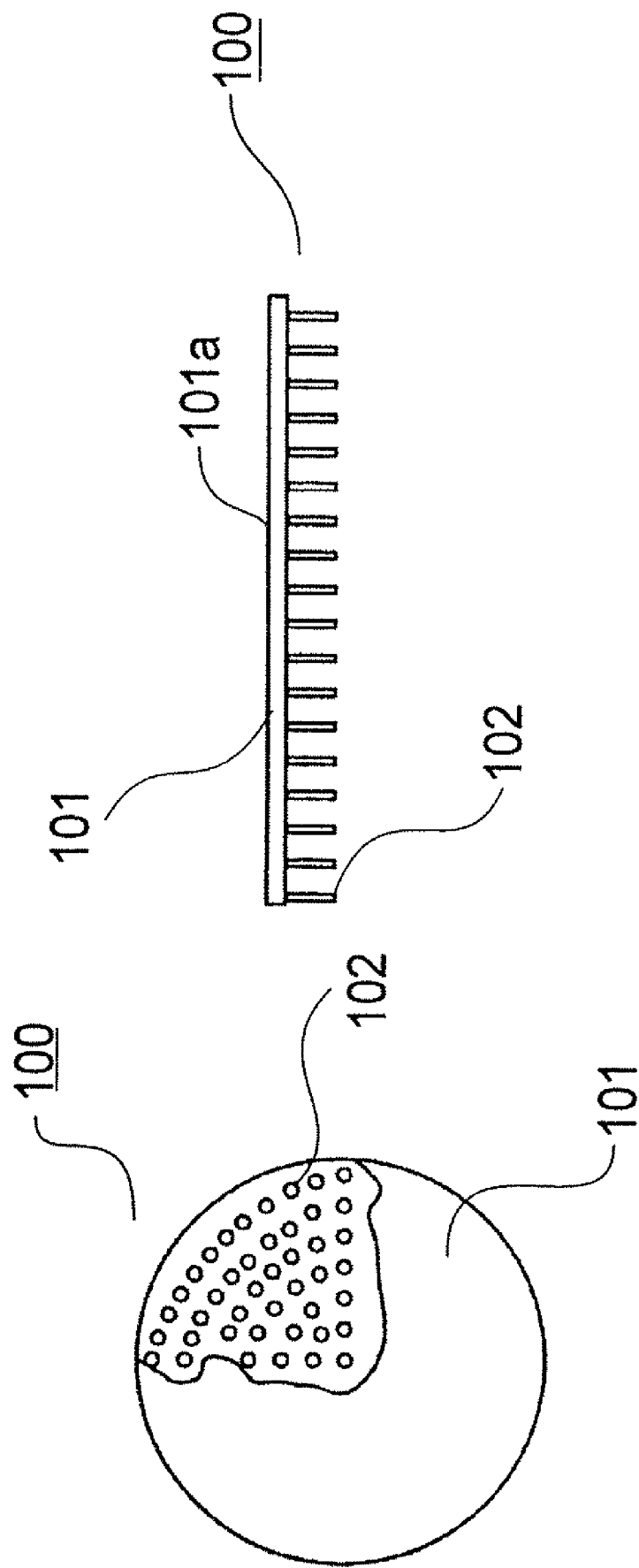
FIG. 9 is a schematic view for explaining a mirror structure of known example.
Figures 10A, 10B:
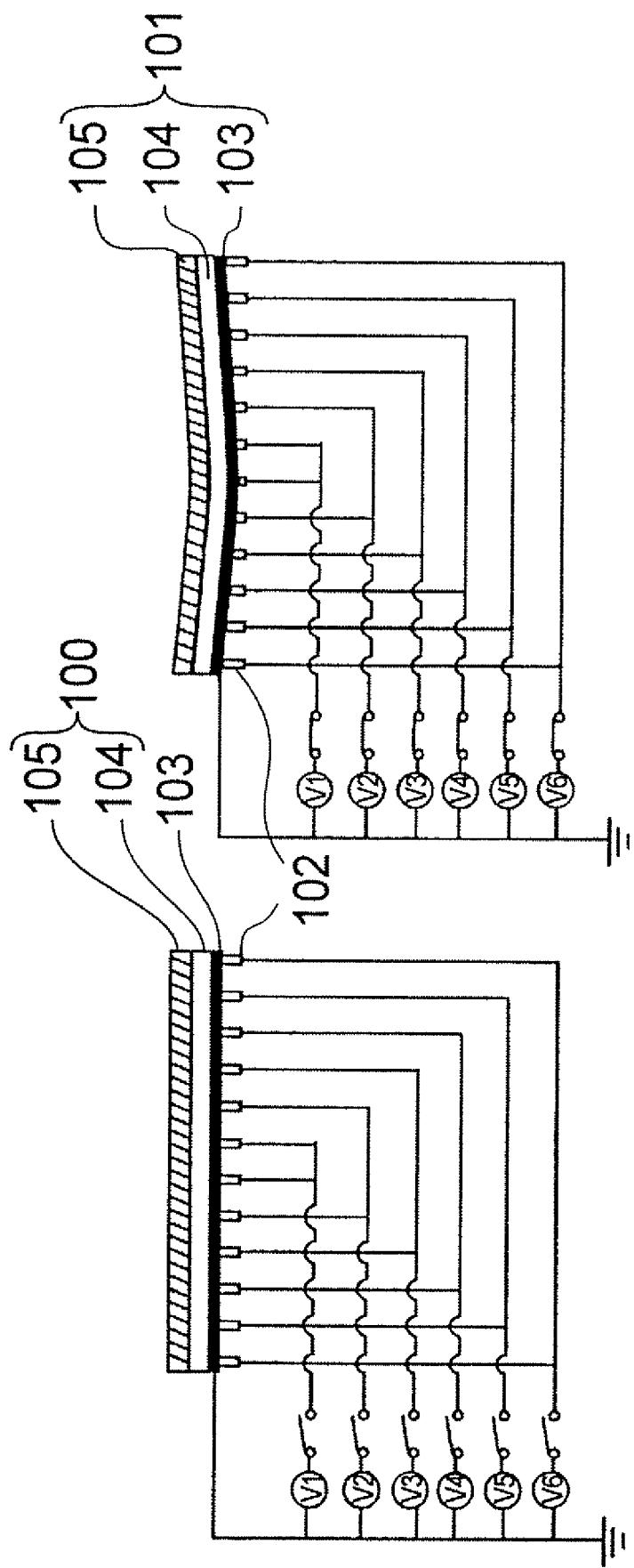
FIGS. 10A and 10B are schematic views for explaining a mirror structure of known example.

A sixth embodiment of the present invention concerns a projection exposure apparatus that comprises an optical system having a mirror unit (multilayered film mirror) according to any one of the embodiments described hereinbefore. FIG. 8 is a schematic view of a main portion of the projection exposure apparatus of this embodiment, and it illustrates a projection exposure apparatus using EUV light.

The projection exposure apparatus shown in FIG. 8 comprises an EUV light source 81 that includes a pulse laser 81-1, a condensing lens 81-2, a prism 81-3, and a target supplying device 81-4; an illumination optical system 82 that includes a first mirror 82-1, an optical integrator 82-4, a second mirror 82-2, and a third mirror 82-3; a reflection type reticle R held by a reticle chuck 83; a projection optical system 84 that includes first to fourth projection system mirrors 84-1 to 84-4; a reticle stage 85; a wafer stage 86 for holding a wafer chuck 86-1; an alignment optical system 87 that includes an alignment detection optical system 87-1 and 87-2 and a focus detection optical system 87-3; and a vacuum system 88 for keeping the above-described components in a vacuum ambience.

The EUV light source comprises a laser plasma light source 81-1, for example. In the laser plasma light source, pulsed laser light of large intensity is projected on a target material 81-3, placed inside a vacuum container, through a condenser lens 81-2, whereby a high-temperature plasma is produced. EUV light of a wavelength of 13 nm order, for example, emitted from the plasma is used. As regards the target material 18-3, metal film, gas jet or liquid drops may be used. In order to obtain improved average intensity of the emitted EUV light, the repetition frequency of the pulse laser should be high, and generally, the laser is operated at a repetition frequency of a few KHz.

The illumination optical system comprises a plurality of condensing mirrors 82-1 to 82-3 and an optical integrator 82-4. The condensing mirrors serve to collect EUV light being approximately isotropically emitted from the laser plasma. The optical integrator 82-4 has a function for illuminating a reticle (mask) R uniformly with a predetermined numerical aperture. Also, the illumination optical system includes an aperture (view angle restricting aperture) for restricting the illumination region on the reticle R into an arcuate shape.

The projection optical system has a plurality of reflection mirrors. The number of these mirrors is about four to six. As regards the shape of the mirror reflection surface, it may be a spherical surface being convex or concave, or an aspherical surface. The numerical aperture NA is about 0.1 to 0.2.

There is a scan mechanism with which the reticle stage 85 and the wafer stage 86 can be scanningly moved synchronously at a speed ratio proportional to the reduction magnification. Here, the scan direction on the reticle R surface or wafer W surface is taken as X, a direction perpendicular to the scan direction is taken as Y, and a direction perpendicular to the reticle R surface or wafer W surface is taken as Z.

The reticle R is held on a reticle stage 83. The reticle stage has a mechanism by which it can be moved in X direction at a high speed. Additionally, there are fine-motion mechanisms in regard to X, Y and Z directions as well as rotational directions around X, Y and Z axes, by which a reticle can be positioned precisely. The position and attitude of the reticle stage 85 are measured by means of laser interferometers, and the position and attitude are controlled on the basis of the measurement.

The wafer W is held on the wafer stage 86 through a wafer chuck 86-1. Similarly to the reticle stage 85, the wafer stage 86 has a mechanism with which it can be moved in X direction at a high speed. Additionally, there are fine-motion mechanisms in regard to X, Y and Z directions as well as rotational directions around X, Y and Z axes, by which a wafer can be positioned precisely. The position and attitude of the wafer stage 86 are measured by means of laser interferometers, and the position and attitude are controlled on the basis of the measurement.

The alignment detecting mechanism 87-1 to 87-3 has a function for measuring the positional relation between the reticle R position and the optical axis of the projection optical system 84, as well as the positional relation between the wafer W position and the optical axis of the projection optical system 84. Also, it functions to set the positions and angles of the reticle stage 85 and the wafer stage 86 so that a projected image of the reticle R is registered with a predetermined position of the wafer W.

The focus position detecting mechanism 87-3 measures the focus position upon the wafer W surface, and it controls the position and angle of the wafer stage 86 thereby to continuously hold the wafer W surface at the imaging position of the projection optical system 84.

As a single scan exposure on the wafer W is completed, the wafer stage 86 moves stepwise in X and Y directions, toward the scan exposure starting position for a subsequent shot. Again, the reticle stage 85 and the wafer stage 86 are scanningly moved synchronously in X direction, at a speed ratio proportional to the reduction magnification of the projection optical system 84.

In the manner described above, a reduced and projected image of the reticle R is imaged upon a wafer W and in this state the reticle R and the wafer W are scanningly moved.

Such operation is repeated (step-and-scan), whereby the pattern of the reticle R is transferred to the whole surface of the wafer W.

In this embodiment, each of the reflection mirrors shown in FIG. 8 comprise a mirror unit according to any one of the first to fifth embodiments described hereinbefore. An exposure apparatus of good optical performance is therefore accomplished.

Next, referring to FIGS. 22 and 23, an embodiment of a device manufacturing method which uses an exposure apparatus described above, will be explained.

Figure 22:
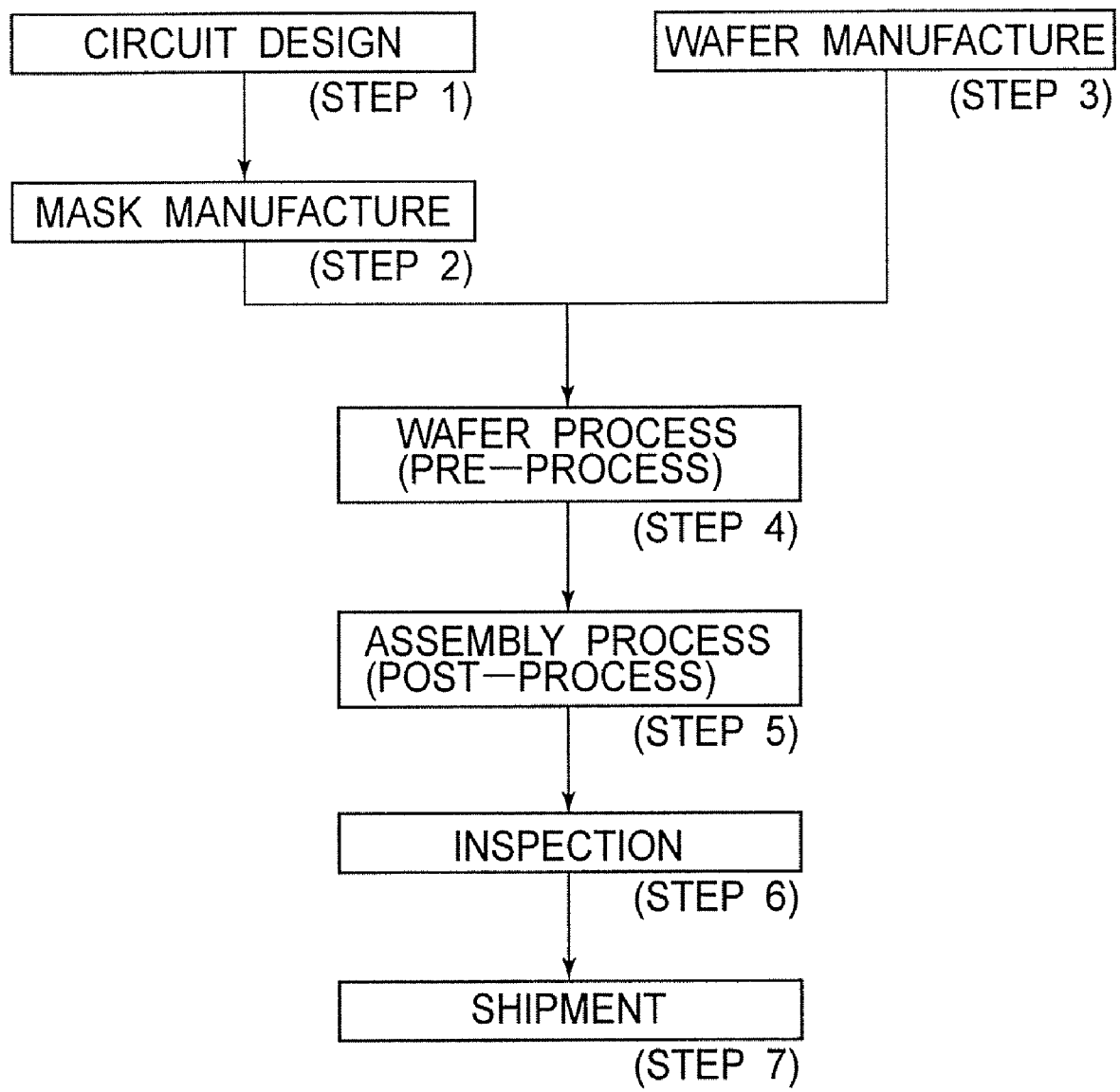
FIG. 22 is a flow chart for explaining the procedure of manufacturing microdevices such as semiconductor chips (e.g. IC or LSI), LCD, or CCD, for example.

FIG. 22 is a flow chart for explaining the procedure of manufacturing various microdevices such as semiconductor chips (e.g., ICs or LSIs), liquid crystal panels, or CCDs, for example. Here, semiconductor chip production will be taken as an example. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process which is called a pre-process wherein, by using the thus prepared mask and wafer, a circuit is formed on the wafer in practice, in accordance with lithography. Step 5 subsequent to this is an assembling step which is called a post-process wherein the wafer having been processed at step 4 is formed into semiconductor chips. This step includes an assembling (dicing and bonding) process and a packaging (chip sealing) process. Step 6 is an inspection step wherein an operation check, a durability check an so on, for the semiconductor devices produced by step 5, are carried out. With these processes, semiconductor devices are produced, and they are shipped (step 7).

Figure 23:
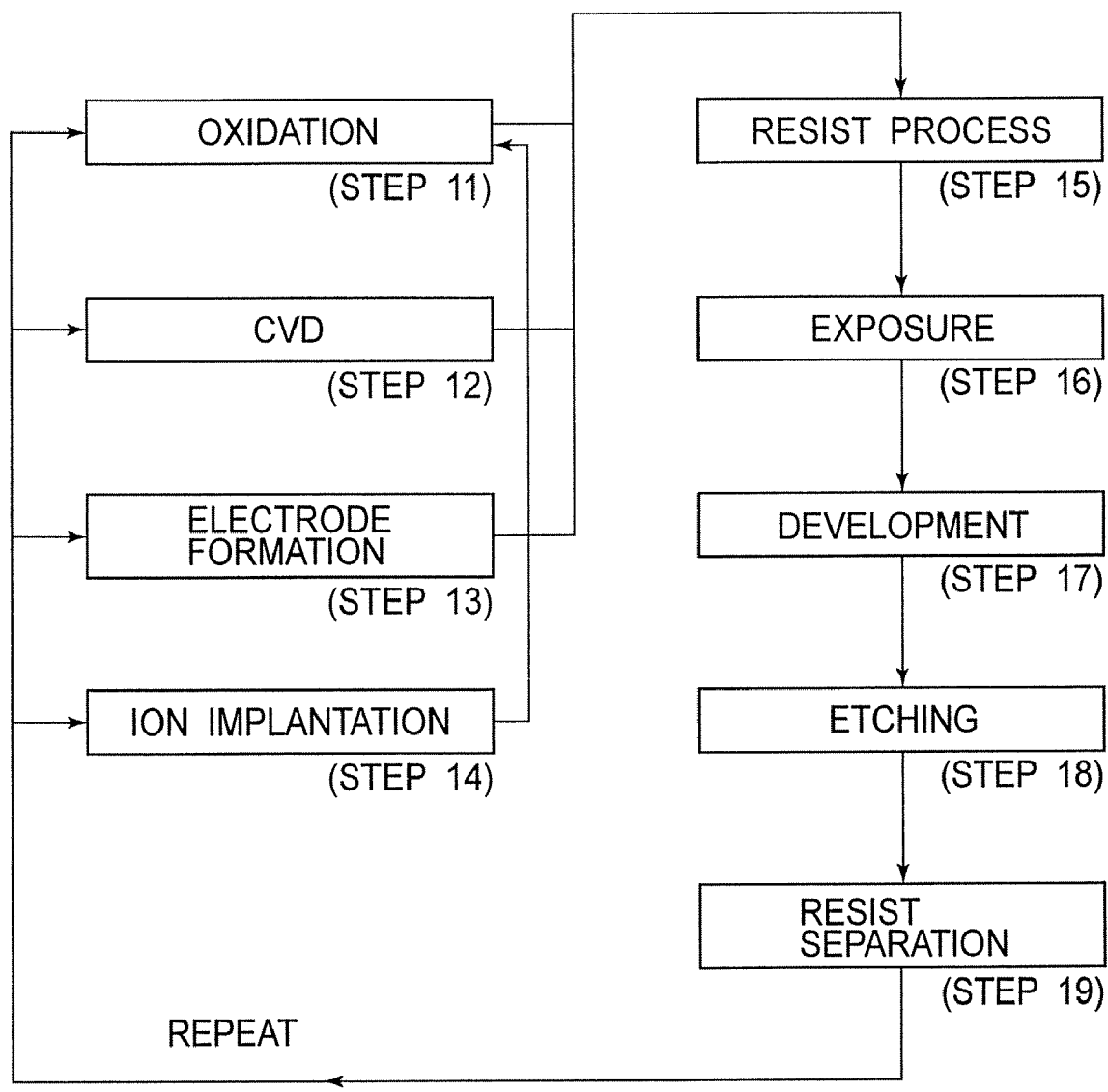
FIG. 23 is a flow chart for explaining details of a wafer process included at step 4 of FIG. 22.

FIG. 23 is a flow chart for explaining details of the wafer process. Step 11 is an oxidation process for oxidizing the surface of a wafer. Step 12 is a CVD process for forming an insulating film on the wafer surface. Step 13 is an electrode forming process for forming electrodes upon the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

With these processes, higher performance microdevices can be manufactured. Hence, a device manufacturing method that uses an exposure apparatus as well as a device as a product thereof are also in the scope of the present invention.

In accordance with the embodiments of the present invention as described hereinbefore, substrate deforming means for producing deformation of a substrate as well as coating and milling means (method of partially removing a multilayered film) are used in appropriate combination, by which a high quality mirror unit having small wavefront aberration and large reflectance can be provided in a simple procedure.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-128128 filed Apr. 23, 2004, for which is hereby incorporated by reference.

What is claimed is:

1. A mirror unit, comprising:
    a mirror with a multilayered film formed on a substrate, said multilayered film having two different materials periodically laminated in layers on the substrate; and
    a substrate deforming unit configured to produce deformation of a shape of the substrate;
    wherein, in the multilayered film, the number of laminated layers in a predetermined region of the substrate differs from that in another region of the substrate,
    wherein, with respect to deformations of the mirror, said substrate deforming unit is configured to correct a deformation of a predetermined period, and
    wherein, among the deformations of the mirror, a deformation of the mirror having a period smaller than the predetermined period is corrected based on making the number of laminated layers of the multilayered film in the predetermined region of the substrate different from that in another region of the substrate by an amount which corresponds to a product of a period of the multilayered film as multiplied by an integral number.

2. A mirror unit according to claim 1, wherein, in a region of the substrate having a smallest number of laminated layers, a film having forty periods or more is formed.

3. A mirror unit according to claim 1, wherein the multilayered film in said predetermined region has laminated layers of a number having been made different from that of the other region by cutting one or more layers of a multilayered film having the same number of layers as that of the other region.

4. A mirror unit according to claim 1, wherein said substrate deforming unit deforms the shape of a period component corresponding to a half or more of the size of the substrate surface.

5. A mirror unit according to claim 1, wherein said substrate deforming unit is configured to correct a deformation of a period greater than half of a size of the substrate, and wherein a deformation of the mirror having a period not greater than one-tenth of the size of the substrate is corrected based on making the number of laminated layers of the multilayered film in the predetermined region of the substrate different from that in another region of the substrate.

6. An exposure apparatus, comprising:
    a mirror unit for projecting a pattern of an original onto a member to be exposed, said mirror unit including
        (i) a mirror with a multilayered film formed on a substrate, said multilayered film having two different materials periodically laminated in layers on the substrate, and
        (ii) a substrate deforming unit configured to produce deformation of a shape of the substrate,
    wherein, in the multilayered film, the number of laminated layers in a predetermined region of the substrate differs from that in another region of the substrate;
    and a stage for holding the member to be exposed,
    wherein, with respect to deformations of the mirror, said substrate deforming unit is configured to correct a deformation of a predetermined period, and
    wherein, among the deformations of the mirror, a deformation of the mirror having a period smaller than the predetermined period is corrected based on making the number of laminated layers of the multilayered film in the predetermined region of the substrate different from that in another region of the substrate by an amount which corresponds to a product of a period of the multilayered film as multiplied by an integral number.

7. A device manufacturing method, comprising the steps of:

exposing a member to be exposed, to a pattern of an original by use of an exposure apparatus; and developing the exposed member, wherein the exposure apparatus includes a mirror unit for projecting a pattern of an original onto a member to be exposed, said mirror unit including (i) a mirror with a multilayered film formed on a substrate, said multilayered film having two different materials periodically laminated in layers on the substrate, and ii) a substrate deforming unit configured to produce deformation of a shape of the substrate, wherein, in the multilayered film, the number of laminated layers in a predetermined region of the substrate differs from that in another region of the substrate, wherein, with respect to deformations of the mirror, said substrate deforming unit is configured to correct a deformation of a predetermined period, and wherein, among the deformations of the mirror, a deformation of the mirror having a period smaller than the predetermined period is corrected based on making the number of laminated layers of the multilayered film in the predetermined region of the substrate different from that in another region of the substrate by an amount which corresponds to a product of a period of the multilayered film as multiplied by an integral number.

* * * * *